United States Patent
Inada et al.

(10) Patent No.: US 8,909,870 B2
(45) Date of Patent: Dec. 9, 2014

(54) CACHE EVICTIONS FROM DATA CACHE BASED ON CONTENT OF ADDRESS TRANSLATION TABLE CACHE AND ADDRESS TRANSLATION TABLE

(71) Applicant: Hitachi, Ltd., Tokyo (JP)

(72) Inventors: Ryoichi Inada, Atsugi (JP); Ryo Fujita, Hitachi (JP); Takuma Nishimura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 235 days.

(21) Appl. No.: 13/661,226

(22) Filed: Oct. 26, 2012

(65) Prior Publication Data

US 2013/0111116 A1    May 2, 2013

(30) Foreign Application Priority Data

Oct. 28, 2011    (JP) ................... 2011-236909

(51) Int. Cl.
*G06F 12/02* (2006.01)
*G06F 12/12* (2006.01)
*G06F 12/08* (2006.01)

(52) U.S. Cl.
CPC ............ *G06F 12/02* (2013.01); *G06F 12/0246* (2013.01); *G06F 12/0871* (2013.01); *G06F 12/127* (2013.01); *G06F 2212/214* (2013.01); *G06F 2212/7201* (2013.01)
USPC .... 711/133; 711/103; 711/207; 711/E12.008; 711/E12.062; 711/E12.07

(58) Field of Classification Search
None
See application file for complete search history.

(56) References Cited

U.S. PATENT DOCUMENTS

| | | | | |
|---|---|---|---|---|
| 5,542,062 A * | 7/1996 | Taylor et al. | ..................... | 711/3 |
| 7,070,113 B2 * | 7/2006 | Shiraishi et al. | ............... | 235/492 |
| 8,108,593 B2 * | 1/2012 | Yano et al. | .................... | 711/103 |
| 8,250,332 B2 * | 8/2012 | Plondke et al. | ............... | 711/205 |
| 8,700,840 B2 * | 4/2014 | Paley et al. | .................... | 711/103 |
| 2004/0139282 A1 * | 7/2004 | Yoshioka et al. | ............. | 711/133 |
| 2007/0016719 A1 * | 1/2007 | Ono et al. | ..................... | 711/103 |
| 2010/0100685 A1 * | 4/2010 | Kurosawa et al. | ............ | 711/128 |
| 2012/0215965 A1 | 8/2012 | Inada et al. | | |
| 2012/0254523 A1 * | 10/2012 | Shimada | ....................... | 711/103 |
| 2012/0284587 A1 * | 11/2012 | Yu et al. | ........................ | 714/773 |

FOREIGN PATENT DOCUMENTS

JP    2011-070470 A    4/2011

* cited by examiner

*Primary Examiner* — Nathan Sadler
*Assistant Examiner* — Michael Westbrook
(74) *Attorney, Agent, or Firm* — Mattingly & Malur, PC

(57) ABSTRACT

A storage device includes a non-volatile memory, a cache memory and a memory controller. The non-volatile memory stores a logical-to-physical address translation table for managing partitioned data and storage locations thereof. The cache memory stores a data cache and a logical-to-physical address translation table cache which holds a portion of the logical-to-physical address translation table. When the memory controller receives a data read-out request from outside, in the case no empty entry is found in the data cache, among the partitioned data in the data cache, it creates an empty entry to read out the data thereto by evacuating partitioned data of which entries in the logical-to-physical address translation table exist in the logical-to-physical address translation table cache into the non-volatile memory prior to other partitioned data.

8 Claims, 23 Drawing Sheets

FIG. 3

| DATA CACHE ENTRY NUMBER (14a) | LOGICAL-PAGE ADDRESS (14b) | AVAILABLE-SECTOR FLAG (14c) |
|---|---|---|
| 0 | A1 | 1010···0001 |
| ⋮ | | SECTOR N-1 ⇔ SECTOR 0 |
| Cd-1 | An | 1010···0010 |

1: UNAVAILABLE SECTOR
0: AVAILABLE SECTOR

FIG. 4

| TABLE MANAGEMENT NUMBER (32a) | LOGICAL-PAGE ADDRESS (32b) | PHYSICAL ADDRESS OF PARTITIONED DATA | |
|---|---|---|---|
| | | PHYSICAL-BLOCK NUMBER (32c) | PHYSICAL-PAGE NUMBER (32d) |
| 0 | 0 | BLOCK Ba | PAGE Pc |
| ⋮ | ⋮ | ⋮ | ⋮ |
| 0 | A−1 | BLOCK Bj | PAGE Pk |
| 1 | A | BLOCK Bo | PAGE Pu |
| ⋮ | ⋮ | ⋮ | ⋮ |
| 1 | 2A−1 | BLOCK Br | PAGE Pq |
| ⋮ | ⋮ | ⋮ | ⋮ |
| T−1 | (T−1)*A | BLOCK Bv | PAGE Pw |
| ⋮ | ⋮ | ⋮ | ⋮ |
| T−1 | T*A−1 | BLOCK By | PAGE Pz |

FIG. 5

| TABLE CACHE ENTRY NUMBER | AVAILABLE FLAG | TABLE MANAGEMENT NUMBER |
|---|---|---|
| 0 | 1 or 0 | T0 |
| ⋮ | ⋮ | ⋮ |
| Ct-1 | 1 or 0 | Tn |

1: CORRESPONDING ENTRY IS UNAVAILABLE
0: CORRESPONDING ENTRY IS AVAILABLE (EMPTY)

FIG. 15A

| DATA CACHE ENTRY NUMBER 14a | LOGICAL-PAGE ADDRESS 14b | AVAILABLE-SECTOR FLAG 14c |
|---|---|---|
| 0 | D0 | 11111111 |
| 1 | A1 | 11111111 |
| 2 | C0 | 11111111 |

FIG. 15B

| TABLE CACHE ENTRY NUMBER 23a | AVAILABLE FLAG 23b | TABLE MANAGEMENT NUMBER 23c |
|---|---|---|
| 0 | 1 | A |
| 1 | 1 | B |

FIG. 15C

| DATA CACHE ENTRY NUMBER 14a | LOGICAL-PAGE ADDRESS 14b | AVAILABLE-SECTOR FLAG 14c |
|---|---|---|
| 0 | D0 | 11111111 |
| 1 | A1 | 00000000 |
| 2 | C0 | 11111111 |

FIG. 15D

| TABLE CACHE ENTRY NUMBER 23a | AVAILABLE FLAG 23b | TABLE MANAGEMENT NUMBER 23c |
|---|---|---|
| 0 | 1 | A |
| 1 | 1 | B |

FIG. 15E

| DATA CACHE ENTRY NUMBER 14a | LOGICAL-PAGE ADDRESS 14b | AVAILABLE-SECTOR FLAG 14c |
|---|---|---|
| 0 | D0 | 11111111 |
| 1 | B1 | 11111111 |
| 2 | C0 | 11111111 |

FIG. 15F

| TABLE CACHE ENTRY NUMBER 23a | AVAILABLE FLAG 23b | TABLE MANAGEMENT NUMBER 23c |
|---|---|---|
| 0 | 1 | A |
| 1 | 1 | B |

| TABLE MANAGEMENT NUMBER (32a) | LOGICAL-PAGE ADDRESS (32b) | PHYSICAL ADDRESS OF PARTITIONED DATA (32cd) | |
|---|---|---|---|
| | | PHYSICAL-BLOCK NUMBER (32c) | PHYSICAL-PAGE NUMBER (32d) |
| A | A0 | BLOCK Ba | PAGE Pc |
| A | A1 | BLOCK Bd | PAGE Pj |
| ⋮ | | | |
| A | A1023 | BLOCK Bj | PAGE Pk |

| TABLE MANAGEMENT NUMBER (32a) | LOGICAL-PAGE ADDRESS (32b) | PHYSICAL ADDRESS OF PARTITIONED DATA (32cd) | |
|---|---|---|---|
| | | PHYSICAL-BLOCK NUMBER (32c) | PHYSICAL-PAGE NUMBER (32d) |
| A | A0 | BLOCK Ba | PAGE Pc |
| A | A1 | BLOCK Bg | PAGE Pf |
| ⋮ | | | |
| A | A1023 | BLOCK Bj | PAGE Pk |

FIG. 19

| DATA CACHE ENTRY NUMBER | LOGICAL-PAGE ADDRESS | AVAILABLE-SECTOR FLAG | DATA UPDATING FLAG |
|---|---|---|---|
| 0 | A1 | 1010···0001 | 1 OR 0 |
| ⋮ | SECTOR N-1 ⇔ SECTOR 0 | | |
| Cd-1 | An | 1010···0010 | 1 OR 0 |

1: UNAVAILABLE SECTOR
0: AVAILABLE SECTOR

FIG. 20

| TABLE CACHE ENTRY NUMBER | AVAILABLE FLAG | TABLE MANAGEMENT NUMBER | TABLE UPDATING FLAG |
|---|---|---|---|
| 0 | 1 OR 0 | T0 | 1 OR 0 |
| ⋮ | ⋮ | ⋮ | ⋮ |
| Ct-1 | 1 OR 0 | Tn | 1 OR 0 |

1: CORRESPONDING ENTRY IS UNAVAILABLE
0: CORRESPONDING ENTRY IS AVAILABLE (EMPTY)

1: CORRESPONDING ENTRY IS UPDATED
0: CORRESPONDING ENTRY IS NOT UPDATED

CACHE EVICTIONS FROM DATA CACHE BASED ON CONTENT OF ADDRESS TRANSLATION TABLE CACHE AND ADDRESS TRANSLATION TABLE

CROSS-REFERENCE TO RELATED APPLICATION

This application claims the foreign priority benefit of Japanese Patent Application No. 2011-236909, filed on Oct. 28, 2011 in the Japanese Patent Office, the disclosure of which is herein incorporated by reference in its entirety.

TECHNICAL FIELD

The present invention relates to a storage device capable of having a non-volatile memory and a computer using the same.

BACKGROUND OF THE INVENTION

To date, a magnetic disc storage device has been commonly used as an auxiliary storage device for information appliances like a computer. In a magnetic disc storage device, data read-out/writing operations are performed for each of storage units which are referred to as "sectors".

In recent years, the substitution for the magnetic-disc storage device as described above, there has been a considerable increase in the alternative employment of storage devices which use semiconductor memories as their storage media. Of these storage devices, a storage device which uses a flash memory as its storage medium is gradually becoming the mainstream of this field at present. Here, the flash memory is a kind of the EEPROM (Electrically Erasable Programmable Read-Only Memory), i.e., the electrically-erasable and rewritable non-volatile semiconductor memory.

Such a flash memory is superior to the magnetic-disc storage device in its data read-out/writing speeds. In association with the use of this flash memory, however, there exist the following four limitations: The first limitation is as follows: The unit of read-out/writing data (which, generally, is referred to as "a page") and the unit of erasing data (which, generally, is referred to as "a block", and which is constituted from a plurality of pages) are determined and fixed. Accordingly, the block is larger than the page in size. The second limitation is as follows: When overwriting data, the data needs to be rewritten again after erasing the data once temporarily. The third limitation is as follows: When writing data into a certain page in a block, the data needs to be written in accordance with the sequence of continuous page numbers. The fourth limitation is as follows: The upper-limit of the erasing number-of-times is determined and fixed on each block basis.

In JP-A-2011-070470, the description has been given concerning the invention of a storage device using the above-described flash-memory. To achieve a storage device using a memory system which flexibly meets a need of a user, in JP-A-2011-070470, the disclosure is given as follows: "The semiconductor memory device according to the present invention includes: an NAND flash; a user area which has stored user data and is accessible from the outside; a system area which has stored the system information of the NAND flash and is an area exclusive from the user area; a DRAM with the user area and the system area; an NAND-CTL for performing access to the NAND flash; a DRAM-CTL for performing access to the DRAM; an internal bus 16 arranged between the NAND-CTL and the DRAM-CTL for enabling the NAND-CTL to access the system area; and a memory controller with the NAND-CTL, DRAM-CTL, and the internal bus."

PRIOR ART DOCUMENTS

Patent Literature

Patent Literature 1: JP2011-070470 A

SUMMARY OF THE INVENTION

In the invention according to JP-A-2011-070470, a logical-to-physical address translation table to relate a logical address provided from a host CPU to a physical address in a flash-memory is stored in a redundant area in a flash-memory and a part thereof is held in a system area of DRAM. In the invention according to JP-A-2011-070470, however, when read-out/writing data, if a logical-to-physical address translation table corresponding to the data is not held in the system area of DRAM, read-out and writing operations of the logical-to-physical address translation table between the flash-memory and DRAM is needed. Thus, the invention described in JP-A-2011-070470, the processing speed becomes lowered as compared with the one implemented in a case of read-out/writing only data and the erasing number-of-times of the flash memory may be wasted.

Accordingly, in the present invention, an object is to reduce a writing number-of-times of the logical-to-physical address-translation-table information into the non-volatile memory associated with data evacuating processing in a cache memory.

Problems To Be Solved by the Invention

In order to solve the above-described problems, in the present invention, the construction is given as follows: that is, the invention according to claim 1, a storage device comprising:

a non-volatile memory which is capable of performing data read-out/writing processing therefrom/therein and includes a logical-to-physical address translation table having a plurality of entries, the data read-out/writing processing being performed by a predetermined unit of writing data referred to as a page and by a unit of erasing data referred to as a block which is larger than the unit of writing data in size, the plurality of entries being used for managing partitioned data which is partitioned by unit of the page size and a storage location of each partitioned data;

a cache memory which is capable of performing data read-out/writing processing therefrom/therein and includes a logical-to-physical address translation table cache and a data cache, the logical-to-physical address translation table cache temporarily storing a portion of the logical-to-physical address translation table, the data cache temporarily storing the partitioned data; and a memory controller for performing the data read-out/writing processing from/into the non-volatile memory and the cache memory:

wherein the memory controller receives a read-out request for data from outside, in the case that there exists no entry corresponding to the read-out requested data in the data cache and no empty entry exists in the data cache, evacuates partitioned data of which corresponding entry in the logical-to-physical address translation table is found in the logical-to-physical address translation table cache into the non-volatile memory prior to other partitioned data among the partitioned data in the data cache to create an empty entry in the data cache, and includes a processing unit for read-out the read-out request data into the empty entry.

Advantage Effects of the Invention

Accordingly, the present invention makes it possible to reduce a writing number-of-times of the logical-to-physical address-translation-table information into the non-volatile memory associated with data evacuating processing in a cache memory.

BRIEF DESCRIPTION OF THE DRAWINGS

FIG. 3 is a construction diagram for schematically showing cache controlling information according to a first embodiment of the present invention.

FIG. 4 is a construction diagram for schematically showing logical-to-physical address translation table according to a first embodiment of the present invention.

FIG. 5 is a construction diagram for schematically showing cache-controlling information according to a first embodiment of the present invention.

FIG. 15A shows an example of data cache management information and table cache-management information according to the first embodiment of the present invention.

FIG. 15B shows a second example of data cache management information and table cache-management information according to the first embodiment of the present invention.

FIG. 15C shows a third example of data cache management information and table cache-management information according to the first embodiment of the present invention.

FIG. 15D shows a fourth example of data cache management information and table cache-management information according to the first embodiment of the present invention.

FIG. 15E shows a fifth example of data cache management information and table cache-management information according to the first embodiment of the present invention.

FIG. 15F shows a sixth example of data cache management information and table cache-management information according to the first embodiment of the present invention.

FIG. 16A is a diagram illustrating an example of a partitioned translation table according to the first embodiment of the present invention.

FIG. 16B is another diagram illustrating an example of a partitioned translation table according to the first embodiment of the present invention.

FIG. 19 is a construction diagram for schematically showing a computer according to a third embodiment of the present invention.

FIG. 20 is a construction diagram for schematically showing table cache-management information according to the third embodiment of the present invention.

DESCRIPTION OF THE INVENTION

Figure 1:
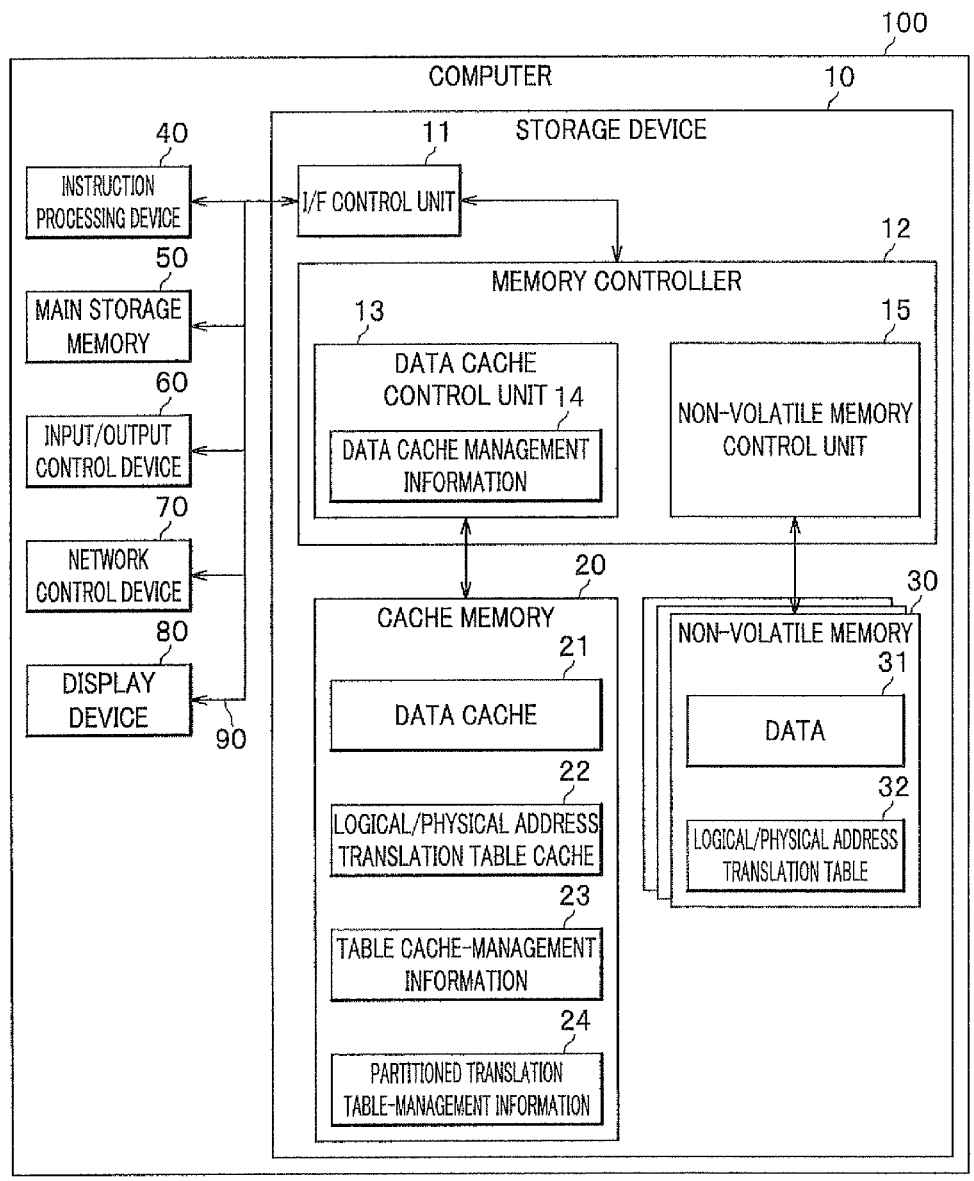
FIG. 1 is a construction diagram for schematically showing a computer according to a first embodiment of the present invention.

Hereinafter, referring to the drawings, the explanation will be given below concerning embodiments of the present invention.

[Construction of a First Embodiment]

FIG. 1 is a construction diagram for schematically showing a computer according to a first embodiment of the present invention. A computer 100 includes a storage device 10, an instruction processing device 40, a main storage memory 50, an input/output control device 60, a network control device 70, a display device 80 and a data bus 90. The storage device 10, the instruction processing device 40, the main storage memory 50, the input/output control device 60, the network control device 70 and the display device 80 are connected to each other by the data bus 90.

The instruction processing device 40 processes data based on instructions stored in a storage device 10 and/or the main storage memory 50 and controls the input/output control device 60, the network control device 70 and the display device 80.

The storage device 10 and the main storage memory 50 perform data read-out/writing operations in accordance with the processing from the instruction processing device 40.

The input/output control device 60 is a device for controlling an input/output of data between the instruction processing device 40 and external devices (not shown) via the data bus 90. The external devices which input or output date via the input/output control device 60 include a keyboard, a mouse, an externally-installable storage device 10 and the like.

The network control device 70 is a device for controlling an input/output of data between the instruction processing device 40 and networks (not shown) via the data bus 90.

The display device 80 is a device for displaying data in accordance with the processing from the instruction processing device 40.

The storage device 10 includes an interface (I/F) control unit 11, a memory controller 12, a cache memory 20 and one or more non-volatile memories 30.

The I/F control unit 11 performs a control of the input/output of data between the instruction processing device 40 and the memory controller 12.

The memory controller 12 controls the cache memory 20 and the non-volatile memory 30. The memory controller 12 includes a data cache control unit 13 and a non-volatile memory control unit 15.

The data cache control unit 13 controls the input/output of data to/from the data cache 21 in accordance with instructions from the processing device 40 by using data cache management information 14. The data cache control unit 13 further controls the non-volatile memory control unit 15 to perform data read-out/writing operation between the data cache 21 and the non-volatile memory 30, and selects evacuating data from the data cache 21 to the non-volatile memory 30.

The data cache management information 14 is to provide information such as an empty area (or an empty entry) in the data cache 21 or a logical address of stored data when the data cache control unit 13 performs the control of the input/output of data in the data cache 21. The data cache management information 14 in accordance with the first embodiment is stored in the data cache control unit 13. However, it is not limited to this, and the data cache management information 14 may be stored in the cache memory 20.

The data cache management information 14 is illustrated in FIG. 3, which will be explained later.

The non-volatile memory control unit 15 performs data read-out/writing processing in the non-volatile memory 30 according to instructions from the data cache control unit 13. Also, the non-volatile memory control unit 15 performs updating processing of a logical-to-physical address translation table cache 22 in the cache memory 20 and/or data read-out/writing processing of a partial content of the logical-to-physical address translation table 32 between the non-volatile memory and the cache memory 20 associated with the data read-out/writing processing in the non-volatile memory 30.

Figure 2:
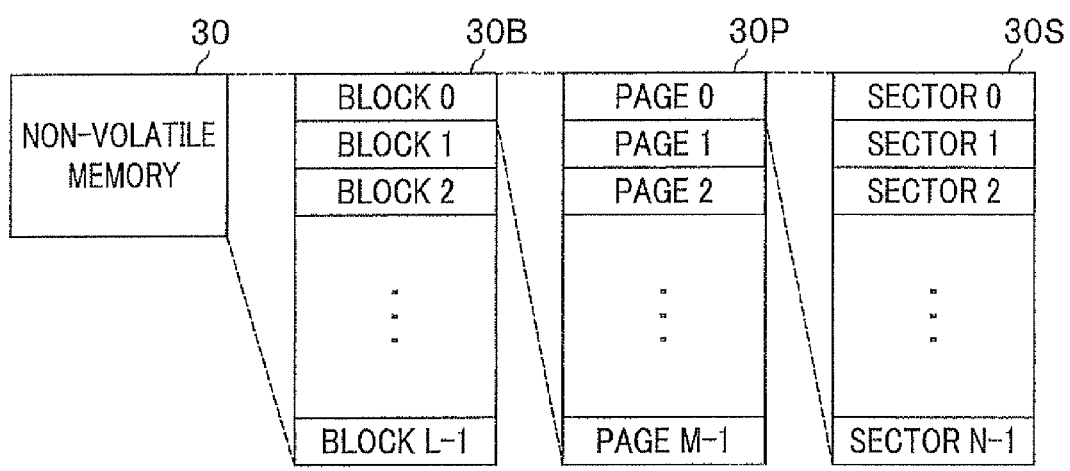
FIG. 2 is a construction diagram for schematically showing a non-volatile memory according to a first embodiment of the present invention.

The non-volatile memory 30 stores therein data 31 and a logical-to-physical address translation table 32. The non-volatile memory 30 according to the first embodiment has a predetermined unit of writing data and a unit of erasing data which is larger than the unit of writing data in size. When rewriting data, this non-volatile memory 30 necessitates the execution of data erasing processing before rewriting the data. The non-volatile memory 30 is illustrated in FIG. 2, which will be explained later.

The data 31 is main data to be memorized in this non-volatile memory 30.

The logical-to-physical address translation table 32 has a plurality of entries for managing data and storage location of each data. The logical-to-physical address translation table 32 is illustrated in FIG. 4, which will be explained later.

The cache memory 20 stores the data cache 21, the logical-to-physical address translation table cache 22, the table cache-management information 23 and partitioned translation table-management information 24. The data cache 21 temporarily holds (or memorizes) data for read-out/writing instructed from the instruction processing device 40. The logical-to-physical address translation table cache 22 temporarily holds (or memorizes) a partial content of the logical-to-physical address translation table 32 stored in the non-volatile memory 30.

The table cache-management information 23 is illustrated in FIG. 5, which will be explained later.

Figure 6:
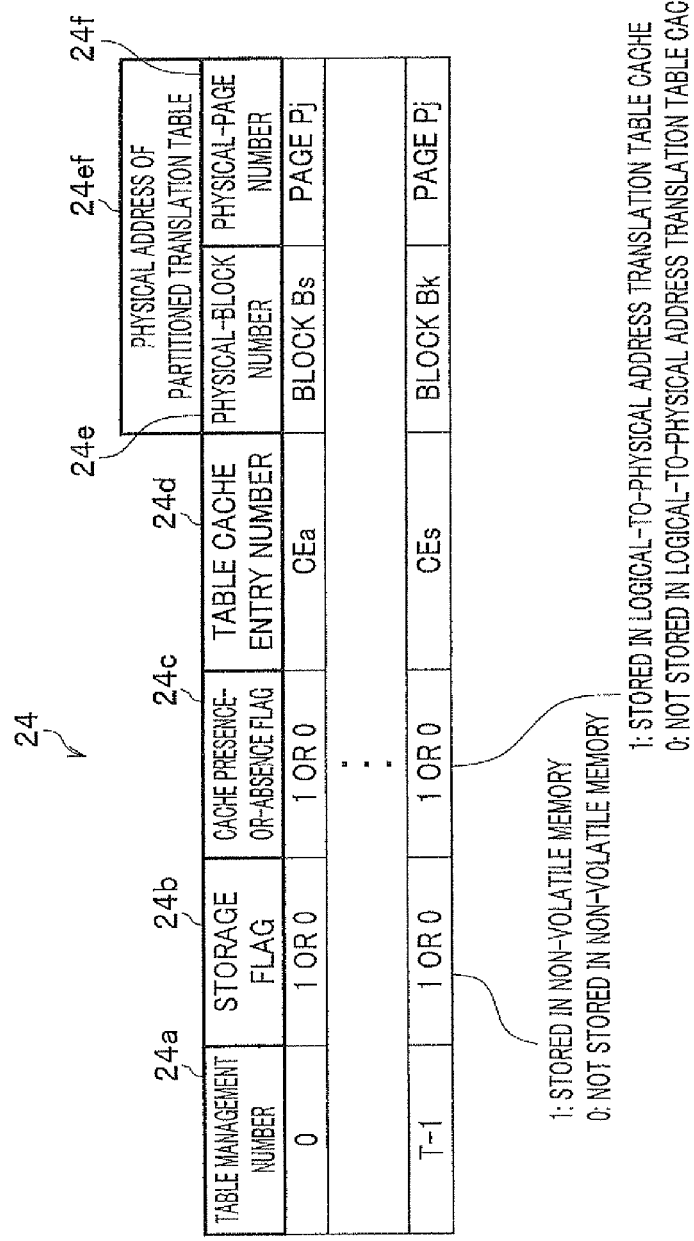
FIG. 6 is a construction diagram for schematically showing partitioned translation table-controlling information according to a first embodiment of the present invention.

The partitioned translation table-management information 24 is illustrated in FIG. 6, which will be explained later.

The cache memory 20 may be non-volatile memories such as a magnetic RAM (MRAM) or a volatile memory such as a static RAM (SRAM) or a dynamic RAM (DRAM). However, in the case that a non-volatile memory is used when rewriting data, the non-volatile memory is required to be one which does not need such data erasing processing at the time of the data rewriting. Further, this cache memory 20 may be arranged in the memory controller 12.

FIG. 2 is a construction diagram for schematically showing a non-volatile memory according to the first embodiment of the present invention.

The non-volatile memory 30 (FIG. 1) is constituted from one or more units of erasing data. This unit of erasing data is referred to as a block 30B. The block 30B is constituted from one or more units of writing data. The unit of writing data is referred to as a page 30P. The page 30P is further constituted from smaller units which are referred to as "sectors" 30S. The smallest unit of data read-out/writing processing in the storage device 10 is a unit of this sector 30S. The non-volatile memory 30 according to the first embodiment is set at L in the number of the blocks, the number of the pages on each block basis is set at M, and the number of the sectors on each page basis is set at N.

The logical-to-physical address translation table 32 (FIG. 4) and the data 31 (FIG. 1) in the non-volatile memory 30 (FIG. 1) are stored in such a manner as to partition them by a size of the page 30P as a unit. Hereinafter, the logical-to-physical address translation table 32 (FIG. 1) which is partitioned by the size of the page 30P is referred to as a partitioned translation table 32p (FIG. 4). The partitioned translation table 32p is illustrated in FIG. 4, which will be explained later. Hereinafter, the data 31 which is partitioned by the size of the page 30P is referred to as partitioned data. The partitioned translation table 32p (FIG. 4) and the partitioned data according to the present embodiment are partitioned and stored in multiples of the page 30P unit in size. The read-out/writing processing of the partitioned data and the partitioned translation table 32p (FIG. 4) into the non-volatile memory 30 (FIG. 1) are performed based on a physical address which is a combination of a physical-block number and a physical page number.

FIG. 3 is a construction diagram for schematically showing cache controlling information according to the first embodiment of the present invention.

The data cache control unit 13 (FIG. 1) manages the data cache 21 (FIG. 1) by partitioned data. A data cache entry number 14 is assigned to each of the partitioned data. The data cache control unit 13 (FIG. 1) holds a logical-page address 14b and an available-sector flag 14c for each data cache entry number 14a. The data cache management information 14 includes the data cache entry number 14a, the logical-page address 14b and the available-sector flag 14c.

The data cache entry number 14a is a number for managing the data cache 21 (FIG. 1) in partitioned data. Cd entries are included in the data cache 21 according to the present embodiment.

The logical-page address 14b is an address which is prepared in such a manner that a logical address of partitioned data specified by the instruction processing device 40 (FIG. 1) is translated from one in sector 30S (FIG. 2) unit to one in page 30P unit (FIG. 2). The translation processing includes steps of: calculating the number of lower bits N from the number of sectors N per page ; and omitting the lower N bits of the logical address specified by the instruction processing device 40 (FIG. 1) . For example, if the number of sectors N equals to 16 (N=16), the lower four bits represent the number of sectors N. Thus, a value corresponding to a logical address specified by the instruction processing device 40 (FIG. 1) of which lower four bits are omitted will be a logical-page address 14b.

The available-sector flag 14c is information for indicating which sector is available when partitioned data assigned with one data cache entry number 14a is viewed in the sector 30S unit (FIG. 2) . Herein, an unavailable-sector is represented by "1", and an available-sector is represented by "0".

The data cache management information 14 further includes an access time field (not shown) to indicate a time at which the partitioned data is accessed. The access time field allows to determining which partitioned data is the earliest accessed one.

FIG. 4 is a construction diagram for schematically showing logical-to-physical address translation table according to the first embodiment of the present invention.

The logical-to-physical address translation table 32 is a table for managing a physical address 32cd which indicates a storage target for partitioned data corresponding to the logical-page address 32b. The logical-to-physical address translation table 32 includes a table management number 32a, the logical-page address 32b and a physical address 32cd. The physical address 32cd is represented by a combination of a physical-block number 32c and a physical-page number 32d.

The table management number 32a is a number for partitioning and managing the logical-to-physical address translation table 32 by page size unit. According to the present embodiment, numbers for managing partitioned translation tables 32p-0 to 32p-(T−1) which equal to T are included.

The logical-page address 32b is an address translated from a logical address specified by the instruction processing device 40 (FIG. 1) by using a similar method of translation into the logical-page address 14b (FIG. 3) in the data cache management information 14 (FIG. 3). The logical-page address 32b stores therein information indicating a logical-page address of the partitioned data associated with the entry.

The physical address 32cd stores therein information indicating a physical address of the partitioned data associated with the entry.

In FIG. 4, entries having a same table management number 32a and shown by using brackets on the right of the table respectively correspond to partitioned translation tables 32p-0 to 32p-(T−1). Hereinafter, when there is no need to identify one among partitioned translation tables 32p-0 to 32p-(T−1), it is just referred to as a partitioned translation table 32p. The partitioned translation table 32p has the same size as the page 30P (FIG. 2). Data evacuating processing and read-out processing for the logical-to-physical address translation table 32 are respectively performed in a unit of the partitioned translation table 32p.

The table management number 32 is a number for managing the logical-to-physical address translation table 32 by partitioning it in each translation table 32p. For example, assuming that each line of the logical-to-physical address translation table 32 can hold amount of information of four bites and thus each page 30P (FIG. 2) can hold amount of information of four kilo bytes. Therefore, the page 30P (FIG. 2) can hold amount of information which equals to 1024 entries in the logical-to-physical address translation table 32. In this case, entries with logical-page addresses 32b from 0 to 1023 are referred to as a partitioned translation table 32p-0 and this partitioned translation table 32p is assigned with 0 (zero) as a table management number 32a. Similarly, entries with logical-page addresses 32b from 1024 to 2047 are referred to as a partitioned translation table 32p-1 and this partitioned translation table 32p is assigned with 1 (one) as a table management number 32a. In this way, the logical-to-physical address translation table 32 is managed in the non-volatile memory 30 (FIG. 1) and the logical-to-physical address translation table cache 22 (FIG. 1) by using the partitioned translation table 32p which is partitioned by the page 30P (FIG. 2) unit and also by using the table management number 32a which is assigned to each partitioned translation table 32p.

In the logical-to-physical address translation table 32 shown in FIG. 4, the logical-page address 32b is arranged neatly in an ascending order.

However, the actual logical-to-physical address translation table 32 is stored by each partitioned translation table 32p. As a result, the logical-page address 32b therein is not necessarily arranged into such a neat arrangement. Also, the swapping of the table information occurs between the logical-to-physical address translation table 32 and the logical-to-physical address translation table cache 22 (FIG. 1). As a result, in the logical-to-physical address translation table cache 22 (FIG. 1) as well, the logical-page addresses 32b are not necessarily arranged neatly into such a neat arrangement.

FIG. 5 is a construction diagram for schematically showing cache-controlling information according to the first embodiment of the present invention.

The table cache-management information 23 includes a table cache entry number 23a, address flag 23b and a table management number 23c.

The table cache entry number 23a stores therein entry numbers for recognize each entry of table cache-management information 23. The table cache-management information 23a has Ct entries. The table cache entry number 23a stores therein the same information as the information stored in a table cache entry number 24d as hereinafter described.

The available flag 23b stores therein information for indicating whether or not the partitioned translation table 32p (FIG. 4) corresponding to the entry is available. When the available flag 23b indicates "1", the partitioned translation table 32p (FIG. 4) corresponding to the entry is unavailable. When the available flag 23b indicates "0", the partitioned translation table 32p (FIG. 4) corresponding to the entry is available (empty).

The table management number 23c stores therein the same information with the information stored in the table management number 32a which is assigned to the partitioned translation table 32p (FIG. 4) corresponding to the entry.

The table cache-management information 23 further includes an access time field (not shown) which shows a time at which the partitioned translation table 32p (FIG. 4) is accessed. By reference to this access time field, it is able to determine which partitioned translation table 32p (FIG. 4) with the oldest access time is.

FIG. 6 is a construction diagram for schematically showing partitioned translation table-management information according to a first embodiment of the present invention.

The partitioned translation table-management information 24 manages each partitioned translation table 32p (FIG. 4) by the table management number 24a. Information held in the partitioned translation table-management information 24 for each table management number 24a are as follows: storage flag 24b, cache presence-or-absence flag 24c, table cache entry number 24d and a physical address 24ef. The physical address 24*ef* further includes information on physical-block number 24*e* and physical page 24*f*. In the present embodiment, the table management number 24*a* can take values from 0 to (T−1).

The storage flag 24*b* is information for indicating whether or not a targeted partitioned translation table 32*p* (FIG. 4) is stored in the non-volatile memories 30 (FIG. 1). If the partitioned translation table 32*p* (FIG. 4) has been already stored in the non-volatile memories 30 (FIG. 1), the flag 24*b* indicates "1". Meanwhile, if the table 32*p* (FIG. 4) has been not yet stored therein, the flag 24*b* indicates "0".

The cache presence-or-absence flag 24*c* is a flag for indicating whether or not the targeted partitioned translation table 32*p* (FIG. 4) is stored in the logical-to-physical address translation table cache 22. If the partitioned translation table 32*p* (FIG. 4) indicated by the table management number 24*a* is stored in the logical-to-physical address translation table cache 22, the cache presence-or-absence flag 24*c* indicates "1". Meanwhile, if the partitioned translation table 32*p* (FIG. 4) is not stored therein, the cache presence-or-absence flag 24*c* indicates "0". This cache presence-or-absence flag 24*c* allows to making a judge quickly on whether or not the targeted partitioned translation table 32*p* (FIG. 4) exists in the logical-to-physical address translation table cache 22 (FIG. 1) without retrieving information in the logical-to-physical address translation table cache 22 (FIG. 1).

The table cache entry number 24*d* is information to indicate where the targeted partitioned translation table 32*p* (FIG. 4) is stored in the logical-to-physical address translation table cache 22 (FIG. 1). By retrieving the table cache entry number 23*a* (FIG. 5) in the table cache-management information 23 according to the table cache entry number 24*d*, it enables to refer the available flag 23*b* (FIG. 5) and the table management number 23*c* (FIG. 5).

The physical-block number 24*e* and the physical-page number 24*f* constituting the physical address 24*ef* are information to indicate where the partitioned translation table 32*p* (FIG. 4) is stored in the non-volatile memory 30 (FIG. 1).

[Processing According To the First Embodiment]
[Data Read-out Processing]

Figure 7:
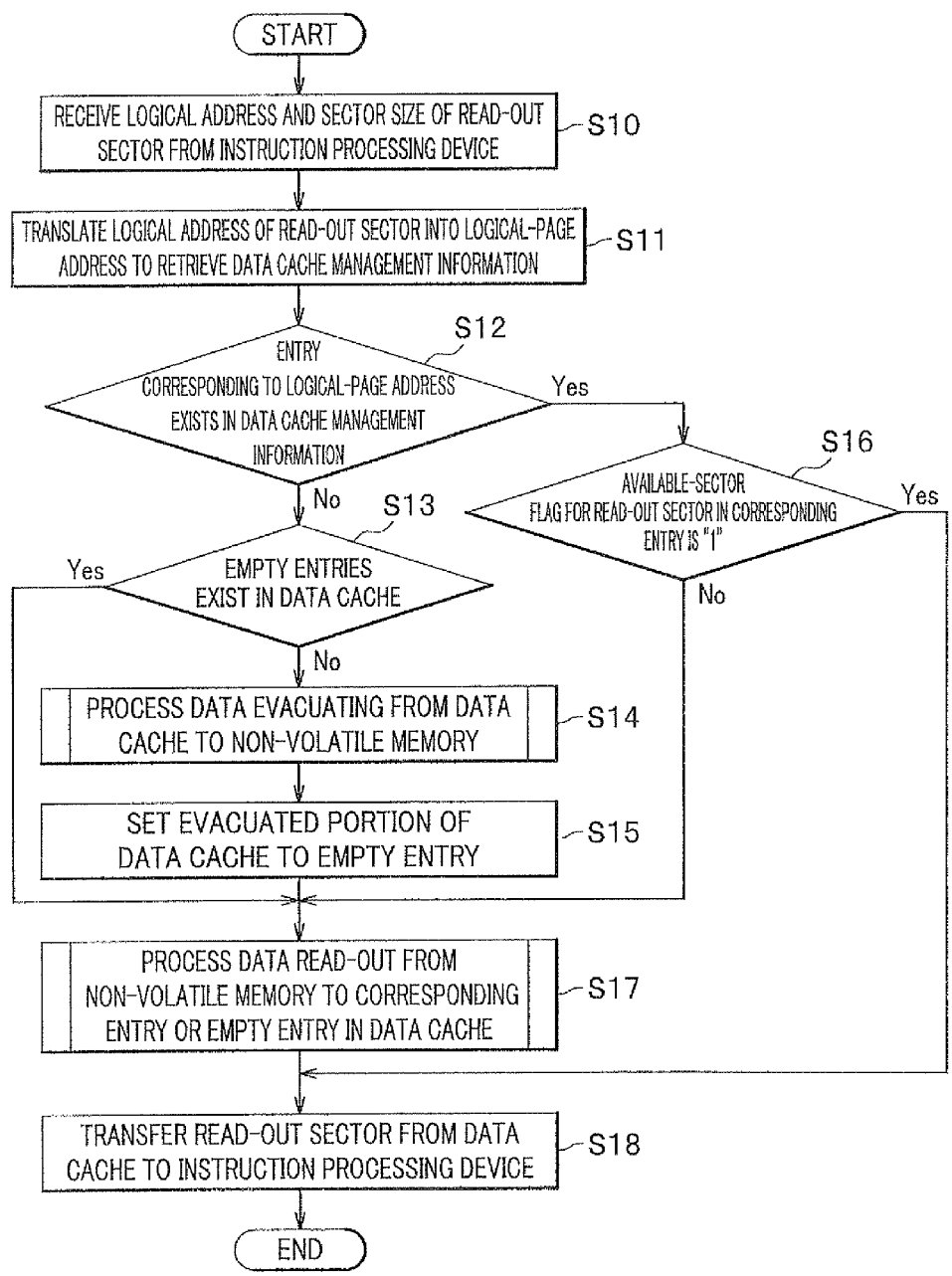
FIG. 7 is a diagram for illustrating the processing flowchart at the time of a data read-out processing according to the first embodiment of the present invention.

FIG. 7 is a diagram for illustrating the processing flowchart at the time of data read-out processing according to the first embodiment of the present invention.

When a data read-out request is input from the instruction processing device 40 (FIG. 1) to the storage device 10 (FIG. 1), the storage device 10 (FIG. 1) starts the data read-out processing.

When the data read-out processing is started, at the step S10, the memory controller 12 (FIG. 1) in the storage device 10 receives a logical address and a sector size of a reading sector via the I/F control unit 11 (FIG. 1).

At the step S11, the memory controller 12 (FIG. 1) in the storage device 10 translates the received logical address into a logical-page address and retrieves the logical-page address 14*b* (FIG. 3) in the data cache management information 14.

At the step S12, the memory controller 12 (FIG. 1) in the storage device 10 determines whether or not an entry which includes the logical-page address 14*b* (FIG. 3) matching the translated logical-page address exists in the data cache management information 14 (FIG. 3). If the memory controller 12 in the storage device 10 (FIG. 1) determines that this condition for decision is not satisfied (No), the processing transfers to a step S13. Meanwhile, it determines that this condition for decision is satisfied (Yes), the processing transfers to a step S16.

At the step S13, the memory controller 12 (FIG. 1) in the storage device 10 determines whether or not an empty entry exists in the data cache 21 (FIG. 1) based on the data cache management information 14 (FIG. 3). That is, in the case all of the available-sector flags 14*c* in the data cache management information 14 (FIG. 3) are "0", the memory controller 12 (FIG. 1) in the storage device 10 determines that the entry associated with the available-sector flags 14*c* (FIG. 3) in the data cache 21 (FIG. 1) is empty.

The memory controller 12 (FIG. 1) in the storage device 10 determines that this condition for decision is satisfied (Yes), the processing transfers to a step S17. Meanwhile, it determines that this condition for decision is not satisfied (No), the processing transfers to a step S14.

At the step S14, the memory controller 12 (FIG. 1) in the storage device 10 performs data evacuating processing from the data cache 21 (FIG. 1) to the non-volatile memory 30 (FIG. 1). The details of the data evacuating processing at the step S14 will be described later, using FIG. 8.

At the step S15, the memory controller 12 (FIG. 1) in the storage device 10 sets a portion from which data is evacuated in the data cache 21 (FIG. 1) as an empty entry and then the processing transfers to a step S17.

At the step S16, the memory controller 12 (FIG. 1) in the storage device 10 determines whether or not the available-sector flag 14*c* (FIG. 3) corresponding to the read-out sector in the entry which is found at step S12 is "1". The memory controller 12 (FIG. 1) in the storage device 10 determines this condition for decision is not satisfied (No), the processing transfers to a step S17. Meanwhile, it determines that this condition for decision is satisfied (Yes), the data of the entry in question is set as a read-out sector and the processing transfers to a step S18.

At the step S17, the memory controller 12 (FIG. 1) in the storage device 10 performs data read-out processing from the non-volatile memory 30 (FIG. 1) to the entry in question or an empty entry in the data cache 21 (FIG. 1). The data read-out processing at the step S17 will be described later, using FIG. 10.

At the step S18, the memory controller 12 (FIG. 1) in the storage device 10 transfers the read-out sector from the data cache 21 (FIG. 1) to the instruction processing device 40 (FIG. 1). The processing illustrated in FIG. 7 is finished until here.

The explanation given until here is the outline of the data read-out processing.

Figure 8:
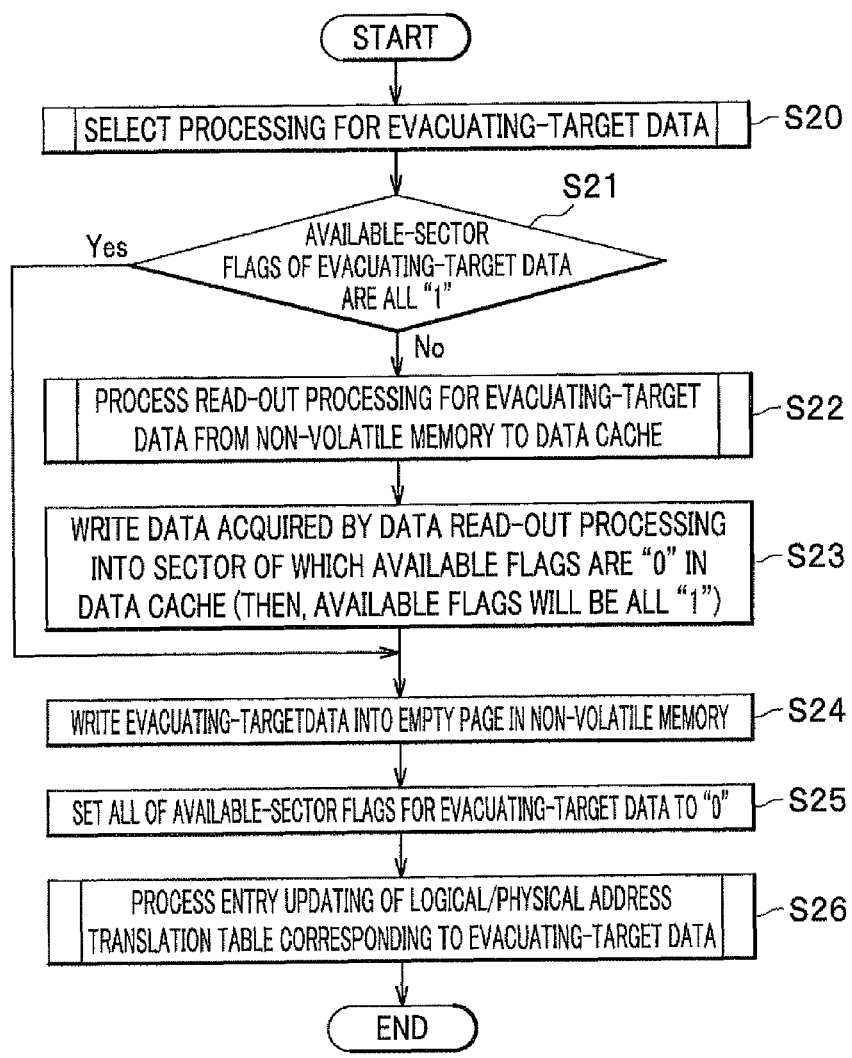
FIG. 8 is a diagram for illustrating the processing flowchart at the time of a data evacuating processing according to the first embodiment of the present invention.

FIG. 8 is a diagram for illustrating the processing flowchart at the time of data evacuating processing to the non-volatile memory according to the first embodiment of the present invention.

At the step S20, the memory controller 12 (FIG. 1) in the storage device 10 performs selection processing of evacuating-target data. The details of the selection processing of evacuating-target data at the step S20 will be described later, using FIG. 9.

At the step S21, the memory controller 12 (FIG. 1) in the storage device 10 checks whether or not the available-sector flags 14*c* (FIG. 3) in the data cache management information 14 corresponding to the selected evacuating-target data are all "1". The memory controller 12 (FIG. 1) in the storage device 10 determines that this condition for decision is satisfied (Yes), the processing transfers to a step S24. Meanwhile, it determines that this condition for decision is not satisfied (No), the processing transfers to a step S22.

At the step S22, the memory controller 12 (FIG. 1) in the storage device 10 performs data read-out processing from the non-volatile memory 30 (FIG. 1) to data cache 21 (FIG. 1) associated with the evacuating-target data. This read-out processing is performed so that the sector data of the corresponding portion stored in the data 31 (FIG. 1) in the non-volatile memory 30 (FIG. 1) is read out to sectors of which available-sector flags 14c (FIG. 3) are "0" in the data cache management information 14 to turn all of the available-sector flags 14c (FIG. 3) into "1". Here, the available-sector flag 14c (FIG. 3) indicating "0" represents that the data associated with the sector is not matched between the data cache 21 (FIG. 1) and the non-volatile memory 30 (FIG. 1). The details of the data read-out processing from the non-volatile memory 30 (FIG. 1) to the data cache 21 (FIG. 1) at the step S22 will be described later, using FIG. 10.

At the step S23, the memory controller 12 (FIG. 1) in the storage device 10 writes the data acquired at the data read-out processing into the sector of which available-sector flag 14c corresponding to the evacuating-target data in the data cache 21 (FIG. 1) is "0" in the data cache management information 14 (FIG. 3). By this processing, all of the available-sector flags 14c (FIG. 3) in the data cache management information 14 are turned into "1".

At the step S24, the memory controller 12 (FIG. 1) in the storage device 10 writes the evacuating-target data to the empty page 30P (FIG. 2) in the non-volatile memory 30 (FIG. 1).

At the step S25, the memory controller 12 (FIG. 1) in the storage device 10 sets all of available-sector flags 14c (FIG. 3) in the data cache management information 14 corresponding to the evacuating-target data into "0" and sets the entry in which the evacuating-target data was stored as an empty entry.

At the step S26, the memory controller 12 (FIG. 1) in the storage device 10 performs entry updating processing of the logical-to-physical address translation table 32 (FIG. 4) corresponding to the evacuating-target data. The entry updating processing of the logical-to-physical address translation table 32 (FIG. 4) at the step S26 will be described later, using FIG. 12. When the memory controller 12 (FIG. 1) in the storage device 10 completes the processing at the step S26, the processing illustrated in FIG. 8 is finished.

Figure 9:
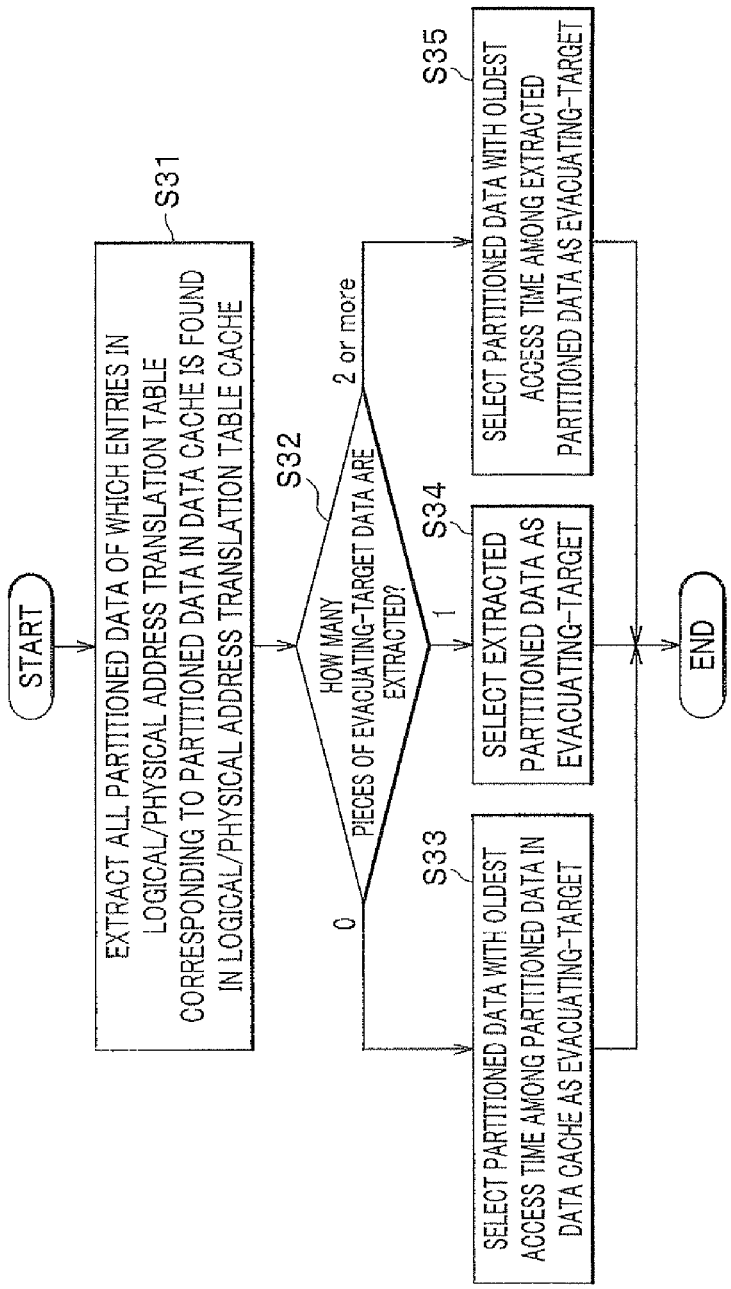
FIG. 9 is a flowchart showing data selection processing for the evacuating-target data according to the first embodiment of the present invention.

FIG. 9 is a flowchart showing data selection processing for the evacuating-target data according to the first embodiment of the present invention.

When the processing is started, at the step S31, the memory controller 12 (FIG. 1) in the storage device 10 extracts all partitioned data which satisfies the followings: 1) partitioned data is in the data cache 21 (FIGS. 1) and 2) entry in the corresponding logical-to-physical address translation table 32 (FIG. 4) associated with the partitioned data exists in the logical-to-physical address translation table cache 22 (FIG. 1).

That is, the memory controller 12 (FIG. 1) in the storage device 10 retrieves a logical-page address 32b (FIG. 4) in the logical-to-physical address translation table cache 22 (FIG. 1) with the logical-page address of the partitioned data to acquire a table management number 32a (FIG. 4) corresponding to the logical-page address 32b. The memory controller 12 (FIG. 1) in the storage device 10 then retrieves the table management number 24a (FIG. 6) in the partitioned translation table-management information 24 with the acquired table management number 32a to extract partitioned data after determining whether or not the cache presence-or-absence flag 24c (FIG. 6) corresponding to the table management number 24a in question is "1".

At the step S32, the memory controller 12 (FIG. 1) in the storage device 10 determines how many pieces of the evacuating-target partitioned data are extracted. The memory controller 12 (FIG. 1) in the storage device 10 performs the processing at the step S33 when a number of extracted pieces is zero. The memory controller 12 (FIG. 1) in the storage device 10 performs the processing at the step S34 when a number of extracted pieces is one. The memory controller 12 (FIG. 1) in the storage device 10 performs the processing at the step S35 when a number of extracted pieces is two or more.

At the step S33, the memory controller 12 (FIG. 1) in the storage device 10 selects partitioned data with the oldest accessed time among partitioned data in the data cache 21 (FIG. 1) as evacuating-target data. Here, the accessed time is used which is indicated in the access time field (not shown) in the data cache management information 14.

At the step S34, the memory controller 12 (FIG. 1) in the storage device 10 determines the extracted partitioned data as an evacuating-target.

At the step S35, the memory controller 12 (FIG. 1) in the storage device 10 selects partitioned data with the oldest accessed time as an evacuating-target if a plurality of pieces of evacuating-target partitioned data are found to be selectable. Here, the accessed time is used which is indicated in the access time field (not shown) in the data cache management information 14 associated with the extracted partitioned data.

That is, when the memory controller 12 (FIG. 1) in the storage device 10 receives a read-out request for data from outside in the case that there is no entry corresponding to the read-out requested data in the data cache management information 14 for managing data cache 21 and there is no empty entry in the data cache management information 14, it creates an empty entry in such a manner that data of which corresponding entry in the logical-to-physical address translation table 32 exists in the logical-to-physical address translation table cache 22 is preferentially evacuated into the non-volatile memory 30 among data in the data cache 21.

The memory controller 12 (FIG. 1) in the storage device 10 according to the first embodiment determines, at the step S35, the entry associated with the partition data with the oldest accessed time among the extracted partitioned data as an evacuating-target based on the existing LRU (Least Recently Used) algorithm. However, it is not limited to this, and the memory controller 12 (FIG. 1) in the storage device 10 may determine partitioned data as a evacuating-target by using other existing algorithm, for example, FIFO (First In First Out) and the like.

Figure 10:
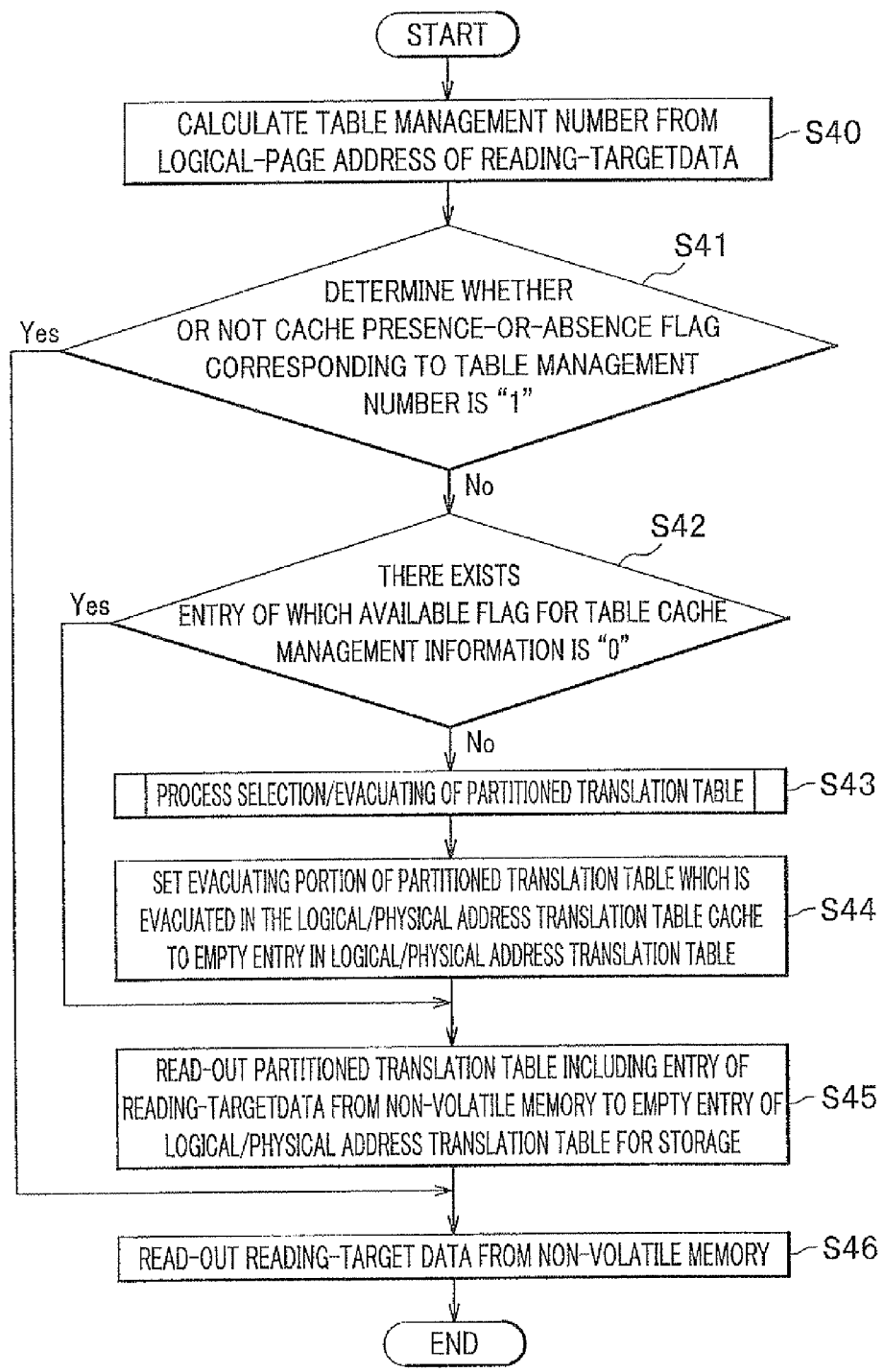
FIG. 10 is a flowchart showing data read-out processing from the non-volatile memory according to the first embodiment of the present invention.

FIG. 10 is a flowchart showing data read-out processing from the non-volatile memory according to the first embodiment of the present invention.

At the step S40, the memory controller 12 (FIG. 1) in the storage device 10 calculates a table management number from the logical-page address of the reading-target data.

That is, the memory controller 12 (FIG. 1) in the storage device 10 retrieves the logical-page address 32b (FIG. 4) of the logical-to-physical address translation table cache 22 (FIG. 1) with the logical-page address of the reading-target data (that is, partitioned data) to acquire a table management number 32a (FIG. 4) corresponding to the logical-page address 32b.

At the step S41, the memory controller 12 (FIG. 1) in the storage device 10 retrieves the table management number 24a (FIG. 6) of the partitioned translation table-management information 24 with the table management number 32a (FIG. 4) and determines whether or not the cache presence-or-absence flag 24c (FIG. 6) associated with the table management number 24a is "1". If the cache presence-or-absence flag 24c (FIG. 6) is "1", a partitioned translation table 32p (FIG. 4) corresponding the table management number 24a exists in the logical-to-physical address translation table cache 22 (FIG. 1). The memory controller 12 (FIG. 1) in the storage device 10 determines that this condition for decision is satisfied (Yes), the processing transfers to a step S46. Meanwhile, it determines that this condition for decision is not satisfied (No), the processing transfers to a step S42.

At the step S42, the memory controller 12 (FIG. 1) in the storage device 10 determines whether or not an empty entry exists in the logical-to-physical address translation table cache 22 (FIG. 1) in such a manner that it determines whether or not there exists an entry of which available flag 23b (FIG. 5) is "0" in the table cache-management information 23.

That is, the memory controller 12 (FIG. 1) in the storage device 10 determines whether or not an available table cache entry number 23a (FIG. 5) exists based on the available flag 23b (FIG. 5) of the table cache-management information 23 corresponding to the reading-target data. The memory controller 12 (FIG. 1) in the storage device 10 determines that this condition for decision is satisfied (Yes), the processing transfers to a step S45. Meanwhile, it determines that this condition for decision is not satisfied (No), the processing transfers to a step S43.

At the step S43, the memory controller 12 (FIG. 1) in the storage device 10 performs selection/evacuating processing for the partitioned translation table 32p (FIG. 4). The details of the selection/evacuating processing for the partitioned translation table 32p (FIG. 4) at the step S43 will be described later, using FIG. 11.

At the step S44, the memory controller 12 (FIG. 1) in the storage device 10 sets a portion of the partitioned translation table 32p (FIG. 4) which is evacuated in the logical-to-physical address translation table cache 22 (FIG. 1) as an empty entry in the logical-to-physical address translation table 32 (FIG. 4).

That is, the memory controller 12 (FIG. 1) in the storage device 10 rewrites the storage flag 24b (FIG. 6) of the partitioned translation table-management information 24 corresponding to the evacuated portion into "1" and rewrites the cache presence-or-absence flag 24c (FIG. 6) into "0". It retrieves the table cache entry number 23a (FIG. 5) of the table cache-management information 23 with the table cache entry number 24d (FIG. 6) of the partitioned translation table-management information 24 corresponding to the evacuated portion, and then rewrites the available flag 23b (FIG. 5) corresponding to the table cache entry number 23a into "0". By the processing at the step S44, an area represented by the table cache entry number 23a (FIG. 5) of the table cache-management information 23 in which the partitioned translation table 32p (FIG. 4) is stored is set as an empty entry.

At the step S45, the memory controller 12 (FIG. 1) in the storage device 10 reads out the partitioned translation table 32p (FIG. 4) including the entry of the reading-target data from the non-volatile memory 30 (FIG. 1) to store it in an empty entry of the logical-to-physical address translation table 32 (FIG. 4). The empty entry is one which is retrieved at the step S42 or which is set at the step S44.

After the partitioned translation table 32p (FIG. 4) including the entry of the reading-target data is stored in the empty entry, the memory controller 12 (FIG. 1) in the storage device 10 rewrites the available flag 23b (FIG. 5) in the table cache-management information 23 corresponding to the entry in which the reading-target data is stored into "1". The memory controller 12 (FIG. 1) in the storage device 10 then updates the table management number 23c (FIG. 5) with the table management number 32a (FIG. 4) of the partitioned translation table 32p. Further, the memory controller 12 (FIG. 1) in the storage device 10 retrieves a table management number 24a (FIG. 6) of the partitioned translation table-management information with the table management number 32a (FIG. 4) of the partitioned translation table 32p which is read out, and then turns the cache presence-or-absence flag 24c (FIG. 6) corresponding to the table management number 24a into "1". Similarly, the memory controller 12 (FIG. 1) in the storage device 10 updates the table cache entry number 24d (FIG. 6) in the partitioned translation table-management information 24 with the table cache entry number 23a (FIG. 5) in the table cache-management information 23.

At the step S46, the memory controller 12 (FIG. 1) in the storage device 10 retrieves a logical-page address 32b of the partitioned translation table 32p in the logical-to-physical address translation table cache 22 (FIG. 1) with the logical-page address of the reading-target data, and thus acquires a physical address 32cd corresponding to the logical-page address 32b. Further, the data cache control unit 13 in the storage device 10 reads out the partitioned data from the non-volatile memory 30 by using the acquired physical address 32cd and stores the partitioned data in the data cache 21. The processing illustrated in FIG. 10 is finished.

At the step S46, when the partitioned data is stored in the data cache 21, if the decision made at the step S12 is "Yes" and if it is determined that there exists a data cache entry number 14a (FIG. 3) in the data cache management information corresponding to a logical-page address of the reading-target data, the partitioned data is stored in the entry associated with the data cache entry number 14a. However, a sector of which available-sector flag 14c is "1" among the sectors of the storage destination entry is occupied with a new partitioned data. Accordingly, the reading-target data is not stored in this area. The reading-target data is stored only in an area of which available-sector flag 14c is "0".

If the decision made at the step S12 is "No" and if it is determined that there exist no data cache entry number 14a (FIG. 3) of the data cache management information 14 corresponding to the logical-page address for the reading-target data, the reading-target data is stored in an empty entry which is set at the step S13 or the step S15.

Figure 11:
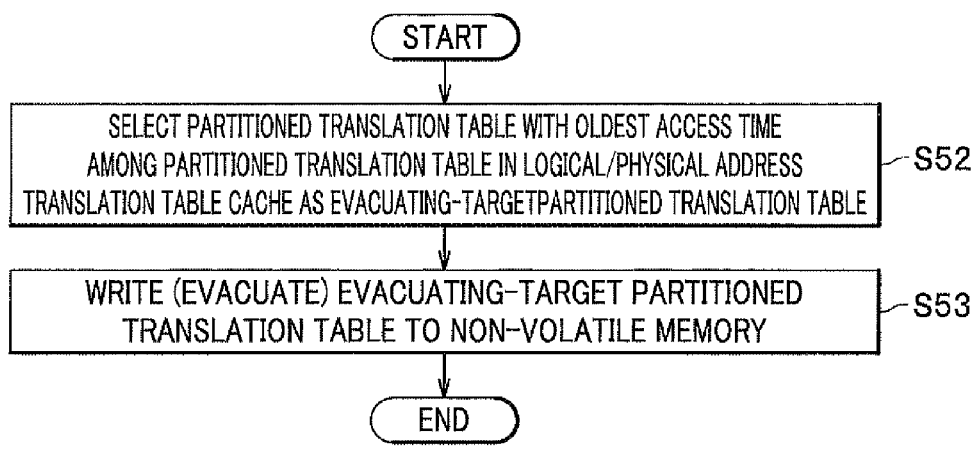
FIG. 11 is a flowchart showing selection/evacuating processing in the partitioned translation table according to the first embodiment of the present invention.

FIG. 11 is a flowchart showing selection/evacuating processing of the partitioned translation table according to the first embodiment of the present invention.

When the processing is started, at the step S52, the memory controller 12 (FIG. 1) in the storage device 10 selects a partitioned translation table 32p (FIG. 4) with the oldest accessed time among the partitioned translation tables 32p (FIG. 4) in the logical-to-physical address translation table cache 22 (FIG. 1) as an evacuating-target partitioned translation table 32p (FIG. 4) . Further, the memory controller 12 (FIG. 1) in the storage device 10 retrieves a table management number 24a (FIG. 6) of the partitioned translation table-management information 24 with the table management number 32a (FIG. 4) of the partitioned translation table 32p which is an evacuating-target and thus acquires a table cache entry number 24d corresponding to the table management number 24a. However, it is not limited to this, and the memory controller 12 (FIG. 1) in the storage device 10 may determine an evacuating-target entry by using other algorithm for selecting an entry, for example, FIFO and the like.

At the step S53, the memory controller 12 (FIG. 1) in the storage device 10 writes (or evacuates) the selected partitioned translation table 32p (FIG. 4) into the non-volatile memory 30 (FIG. 1) and sets the writing-destination address to a physical address 24ef (FIG. 6) of the partitioned translation table-management information 24. Then the processing illustrated in FIG. 11 is finished.

Figure 12:
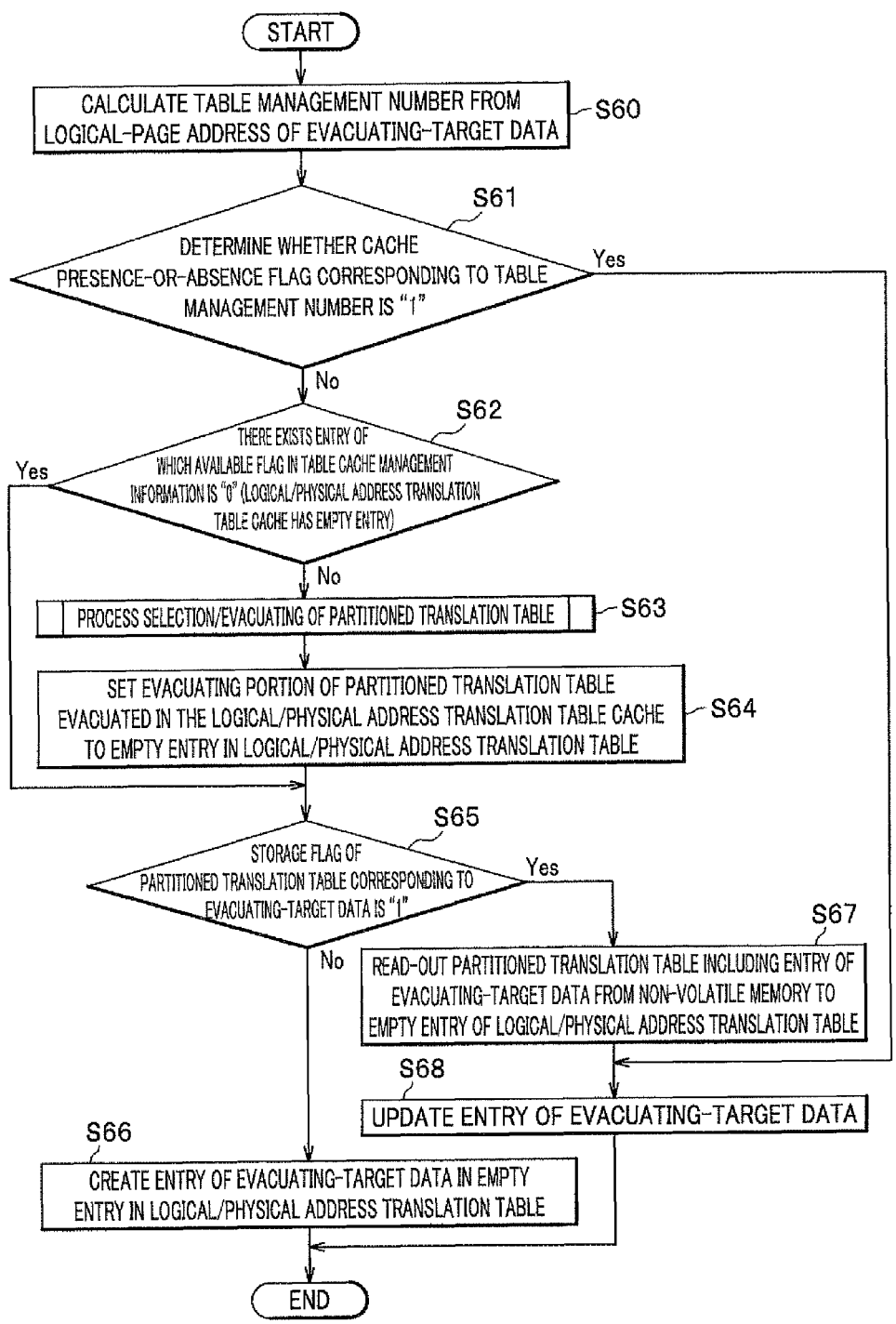
FIG. 12 is a flowchart showing entry updating processing in the logical-to-physical address translation table according to the first embodiment of the present invention.

FIG. 12 is a flowchart showing entry updating processing of the logical-to-physical address translation table according to the first embodiment of the present invention.

At the step S60, the memory controller 12 (FIG. 1) in the storage device 10 acquires a table management number 32a (FIG. 4) corresponding to the logical-page address 32b (FIG. 4) of the evacuating-target data from the logical-page address 32b (FIG. 4). It then retrieves the table management number 24a (FIG. 6) of the partitioned translation table-management information 24 corresponding to the acquired table management number 32a.

At the step S61, the memory controller 12 (FIG. 1) in the storage device 10 determines whether or not the cache presence-or-absence flag 24c (FIG. 6) associated with the retrieved table management number 24a (FIG. 6) is "1". That is, the memory controller 12 (FIG. 1) in the storage device 10 determines whether or not the partitioned translation table 32p (FIG. 4) including the entry of the evacuating-target data exists in the logical-to-physical address translation table cache 22 (FIG. 1). The memory controller 12 (FIG. 1) in the storage device 10 determines that this condition for decision is not satisfied (No), the processing transfers to a step S62. Meanwhile, it determines that this condition for decision is satisfied (Yes), the processing transfers to a step S68.

At the step S62, the memory controller 12 (FIG. 1) in the storage device 10 determines whether or not there exists an entry of which available flag 23b (FIG. 5) in the table cache-management information 23 is "0". That is, the memory controller 12 (FIG. 1) in the storage device 10 determines whether or not there exists an empty entry in the logical-to-physical address translation table cache 22 (FIG. 1). If the memory controller 12 (FIG. 1) in the storage device 10 determines that this condition for decision is not satisfied (No), the processing transfers to a step S63. Meanwhile, it determines that this condition for decision is satisfied (Yes), the processing transfers to a step S65.

At the step S63, the memory controller 12 (FIG. 1) in the storage device 10 performs selection/evacuating processing (FIG. 11) in the partitioned translation table 32p (FIG. 4).

At the step S64, the memory controller 12 (FIG. 1) in the storage device 10 sets the evacuated portion of the partitioned translation table 32p (FIG. 4) in the logical-to-physical address translation table cache 22 (FIG. 1) into an empty entry in the logical-to-physical address translation table 32 (FIG. 4).

At the step S65, the memory controller 12 (FIG. 1) in the storage device 10 determines whether or not the storage flag 24b (FIG. 6) associated with the partitioned translation table 32p (FIG. 4) corresponding to the evacuating-target data is "1". The memory controller 12 (FIG. 1) in the storage device 10 determines that this condition for decision is not satisfied (No), the processing transfers to a step S66. Meanwhile, it determines that this condition for decision is satisfied (Yes), the processing transfers to a step S67.

At the step S66, the memory controller 12 (FIG. 1) in the storage device 10 creates a new partitioned translation table 32p (FIG. 4) in an empty entry of the logical-to-physical address translation table cache 22 (FIG. 1).

That is, the memory controller 12 (FIG. 1) in the storage device 10 retrieves a logical-page address 32b of the partitioned translation table 32p (FIG. 4) with the logical-page address of the evacuated partitioned data and sets the writing-destination address of the evacuated partitioned data into the physical address 32cd corresponding to the logical-page address 32b. After the new partitioned translation table 32p (FIG. 4) is created, the memory controller 12 (FIG. 1) in the storage device 10 retrieves a table cache entry number 23a (FIG. 5) of the empty entry set at the step S62 or at the step S64, rewrites the address flag 23b (FIG. 5) corresponding to the table cache entry number 23a into 1 and also updates the corresponding table management number 23c (FIG. 5). The memory controller 12 (FIG. 1) in the storage device 10 retrieves the table management number 24a (FIG. 6) of the partitioned translation table-management information 24 with a table management number 32a associated with the created partitioned translation table 32p, turns the cache presence-or-absence flag 24c (FIG. 6) corresponding to the table management number 24a to 1, and sets the table cache entry number 24d (FIG. 6) as a value of the table cache entry number 23a (FIG. 5). After the processing at step S66 is finished, the memory controller 12 (FIG. 1) in the storage device 10 finishes the processing illustrated in FIG. 12.

At the step S67, the memory controller 12 (FIG. 1) in the storage device 10 reads out the partitioned translation table 32p (FIG. 4) including the entry of the evacuating-target data into an empty entry in the logical-to-physical address translation table 32 (FIG. 4) from the non-volatile memory 30 (FIG. 1).

At the step S68, the memory controller 12 (FIG. 1) in the storage device 10 updates the entry of the evacuating-target data and then finishes the processing illustrated at FIG. 12.

(Data Writing Processing)

Figure 13:
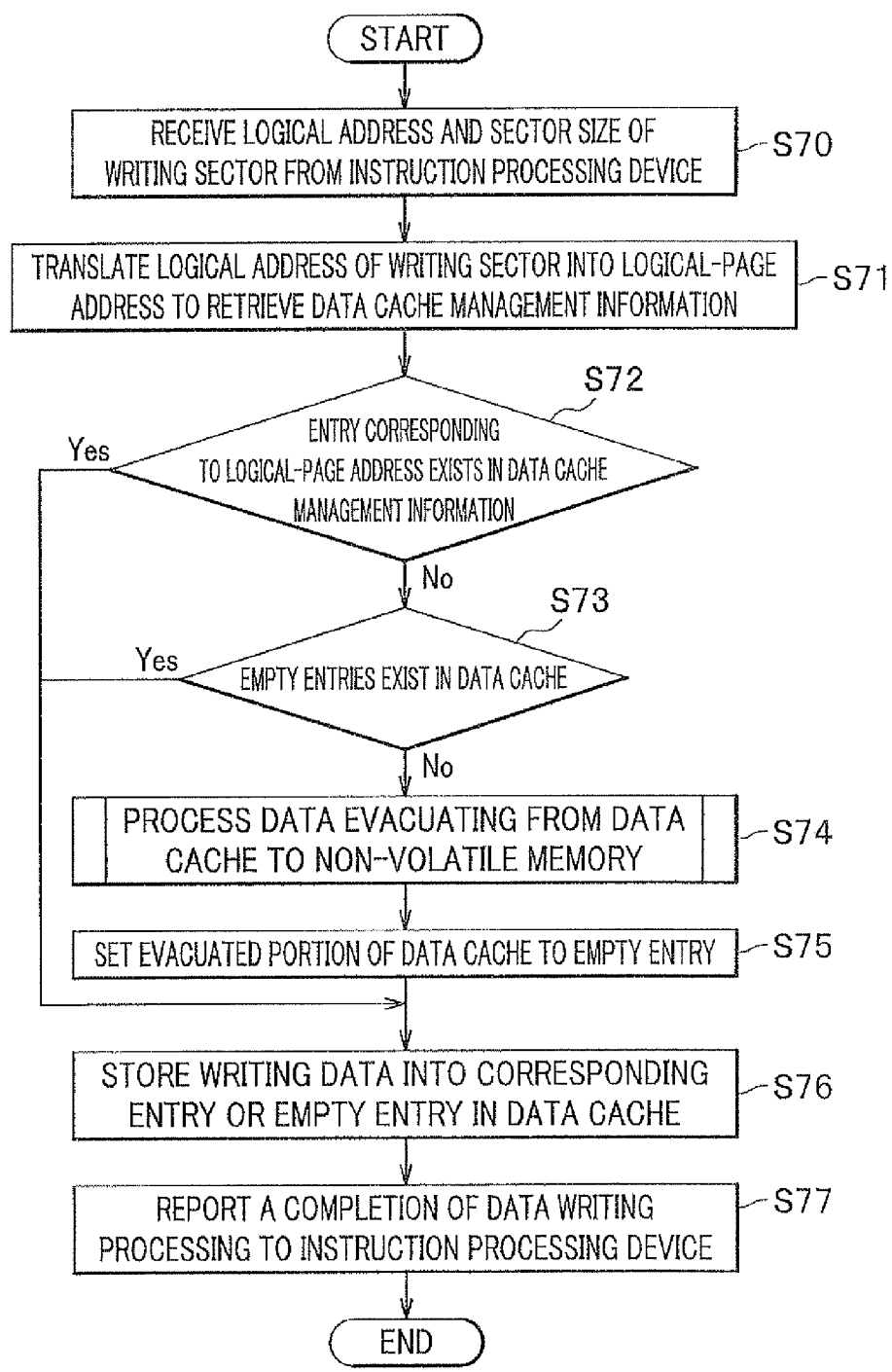
FIG. 13 is a flowchart showing data writing processing according to the first embodiment of the present invention.

FIG. 13 is a flowchart showing data writing processing according to the first embodiment of the present invention.

When a date writing request is input to the storage device 10 (FIG. 1) from the instruction processing device 40 (FIG. 1), the storage device 10 (FIG. 1) starts data writing processing.

When the data writing processing is started, at the step S70, the memory controller 12 (FIG. 1) in the storage device 10 receives a logical address and a sector size of a writing sector and a writing requested data from the instruction processing device 40 (FIG. 1) via the I/F control unit 11 (FIG. 1).

At the step S71, the memory controller 12 (FIG. 1) in the storage device 10 translates the logical address of the writing sector into a logical-page address and retrieves a logical-page address 14b (FIG. 3) of the data cache management information 14.

At the step S72, the memory controller 12 (FIG. 1) in the storage device 10 determines whether or not an entry with a logical-page address 14b (FIG. 3) corresponding to the logical-page address of the writing sector exists in the data cache management information 14 (FIG. 3). The memory controller 12 (FIG. 1) in the storage device 10 determines that this condition for decision is not satisfied (No), the processing transfers to a step S73. Meanwhile, it determines that this condition for decision is satisfied (Yes), the processing transfers to a step S76.

At the step S73, the memory controller 12 (FIG. 1) in the storage device 10 determines whether or not an empty entry exists in the data cache 21 (FIG. 1) based on the data cache management information 14 (FIG. 3). That is, the memory controller 12 (FIG. 1) in the storage device 10 determines that the entry associated with the available-sector flags 14c (FIG. 3) in the data cache 21 (FIG. 1) is empty in the case that the available-sector flags 14c (FIG. 3) of the data cache management information 14 are all "0".

The memory controller 12 (FIG. 1) in the storage device 10 determines that this condition for decision is not satisfied (No), the processing transfers to a step S74. Meanwhile, it determines that this condition for decision is satisfied (Yes), the processing transfers to a step S76.

At the step S74, the memory controller 12 (FIG. 1) in the storage device 10 performs data evacuating processing from the data cache 21 (FIG. 1) to the non-volatile memory 30 (FIG. 1). The data evacuating processing at the step S74 (FIG. 8) is similar to the data evacuating processing at the step S14.

At the step S75, the memory controller 12 (FIG. 1) in the storage device 10 sets the entry of which data is evacuated in the data cache 21 (FIG. 1) as an empty entry and performs the processing at the step S76.

At the step S76, the memory controller 12 (FIG. 1) in the storage device 10 stores the writing requested data received from the instruction processing device 40 (FIG. 1) in the entry with the logical-page address 14b in question or an empty entry in the data cache 21 (FIG. 1). After storing the writing requested data, the memory controller 12 (FIG. 1) in the storage device 10 turns an available-sector flag 14c corresponding to the area to which data is written among the available-sector flags 14c (FIG. 3) corresponding to the writing requested data into "1". For example, when the memory controller 12 (FIG. 1) in the storage device 10 stores data which is an equal amount of one page, all of the available-sector flags 14c (FIG. 3) are turned into "1". While, when only one sector stores data, only one bit corresponding to the sector which stores data among sectors associated with the available-sector flags (FIG. 3) is turned into "1".

At the step S77, the memory controller 12 (FIG. 1) in the storage device 10 sends a response for reporting a completion of the data writing processing to the instruction processing device 40 (FIG. 1) via the I/F control unit 11 (FIG. 1) and then finishes the processing illustrated at FIG. 13.

[Processing at Power-Off]

Figure 14:
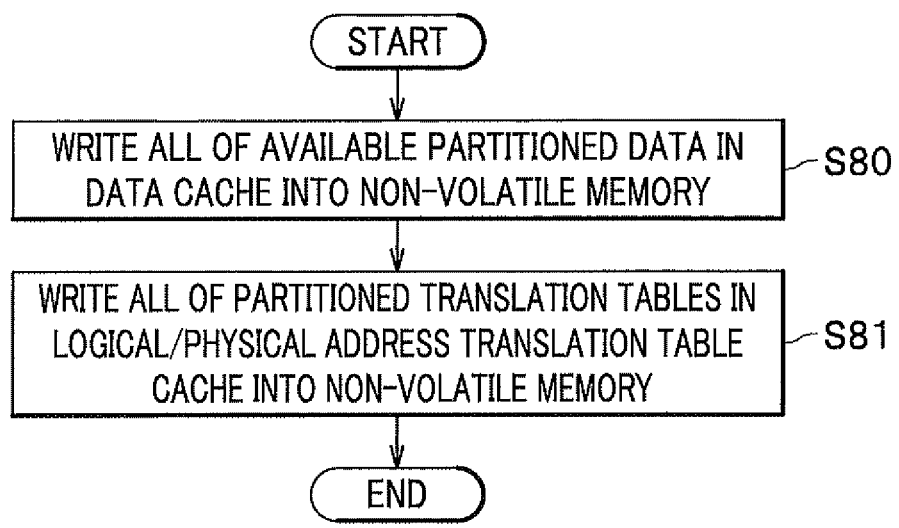
FIG. 14 is a flowchart showing the processing at power-off according to the first embodiment of the present invention.

FIG. 14 is a flowchart showing the processing at power-off according to the first embodiment of the present invention.

For example, when a power switch of the storage device 10 (FIG. 1) is turned to off, the processing at power-off is started. This processing is directed to evacuate data into a non-volatile memory 30 (FIG. 1) for the protection of data since data in the cache memory 20 (FIG. 1) is lost at power-off.

When the processing at power-off is started, at the step S80, the memory controller 12 (FIG. 1) in the storage device 10 writes (or evacuates) all of the partitioned data of which data updating flags 14d are "1" into the non-volatile memory 30 among unavailable partitioned data in the data cache 21.

That is, the memory controller 12 (FIG. 1) in the storage device 10 writes (or evacuates) the partitioned data corresponding to an entry of which available-sector flags 14c (FIG. 3) of the data cache management information 14 are not all zero into the non-volatile memory 30 (FIG. 1).

At the step S81, the memory controller 12 (FIG. 1) in the storage device 10 writes (or evacuates) all of the partitioned translation tables 32p (FIG. 4) stored in the logical-to-physical address translation table cache 22 (FIG. 1) into the non-volatile memory 30 (FIG. 1). After the processing at the step S81 is finished, the data cache control unit 13 in the storage device 10 finishes the processing illustrated at FIG. 14.

EXAMPLES

Next, by using an example, the explanation will be further given below concerning the processing according to the first embodiment. In this example, the number of entries in the data cache 21 (FIG. 1) is made to be three, and the number of entries of the logical-to-physical address translation table cache 22 (FIG. 1) is made to be two. Further, the number of sectors per page in the non-volatile memory 30 (FIG. 1) is made to be eight.

FIGS. 15A-15E show data cache management information and table cache-management information according to the first embodiment of the present invention.

FIG. 15A shows the data cache management information 14 in an initial state of the example. FIG. 15B shows the table cache-management information 23 in an initial state of the example.

In the data cache 21 (FIG. 1), partitioned data (entries) of which logical-page addresses 14b are respectively "D0", "A1" and "C0" are respectively stored.

The logical-to-physical address translation table cache 22 (FIG. 1) stores therein a partitioned translation table 32p of which table management number 23c is "A" and a partitioned translation table 32p of which table management number 23c is At the step S70 (FIG. 13) which represents an initial state, assuming that data of which logical-page address is "B1" and which equals to data amount of eight sectors is input from the instruction processing device 40 (FIG. 1) with a writing request, as an example. The data cache management information 14 has no entry of which logical-page address 14b is "B1" and also has no empty entry.

At the step S72 (FIG. 13), the memory controller 12 (FIG. 1) in the storage device 10 makes a decision of "No" since there exists no entry of which logical-page address 14b is "B1" in the data cache management information 14 and the processing transfers to a step S73 (FIG. 13).

At the step S73 (FIG. 13), the memory controller 12 (FIG. 1) in the storage device 10 makes a decision of "No" since there exists no empty entry in the data cache management information 14 and the processing transfers to a step S74 (FIG. 13).

At the step S74 (FIG. 13), the memory controller 12 (FIG. 1) in the storage device 10 calls the data evacuating processing (FIG. 8) into the non-volatile memory 30 (FIG. 1) from the data cache 21 (FIG. 1). The memory controller 12 (FIG. 1) in the storage device 10 writes (or evacuates) the partitioned data in the data cache 21 (FIG. 1) corresponding to the entry of which data cache entry number 14a is one (data cache entry number 14a =1) into an empty page in the non-volatile memory 30 (FIG. 1).

At the step S75 (FIG. 13), the memory controller 12 (FIG. 1) in the storage device 10 sets the portion from which data is evacuated in the data cache 21 (FIG. 1) as an empty entry.

FIG. 15C shows the data cache management information 14 at the step S75 (FIG. 13). FIG. 15D shows the table cache-management information 23 at the step S75 (FIG. 13).

By the data evacuating processing (FIG. 8) to the non-volatile memory 30, the entry of which data cache entry number 14a is one (data cache entry number 14a =1) is made to be empty in the data cache management information 14. The writing data sent from the instruction processing device 40 (FIG. 1) is stored in the empty entry.

FIG. 15E shows the data cache management information 14 after the processing at step S77 (FIG. 13) is performed. FIG. 15F shows table cache-management information 23 after the processing at step S77 (FIG. 13) is performed.

FIGS. 16A and 16B illustrate an example of a partitioned translation table according to the first embodiment of the present invention.

FIG. 16A shows contents of the partitioned translation table 32p of which table management number 32a is "A" in the initial state of the example.

Here, the partitioned translation table 32p having the table management number A includes information on the logical-to-physical address translation table 32 for logical-page addresses "A0" to "A1023".

FIG. 16B shows contents in the partitioned translation table 32p of which table management number 32a is "A" after the updating processing is performed in the example. In the data of which logical-page address 32*b* is "A1", the physical address 32*cd* is updated.

By using an existing entry selection algorithm, assuming that an entry having a logical-page addresses D0 is made to be an evacuating-target entry. The partitioned translation table 32*p* corresponding to the logical-page address of the writing-target data does not exist in the logical-to-physical address translation table cache 22 (FIG. 1), and no empty entry exists in the logical-to-physical address translation table cache 22 (FIG. 1). Accordingly, writing (or evacuating) of the partitioned translation table 32*p* (FIGS. 16A and 16B) into the non-volatile memory 30 (FIG. 1) occurs. This causes erasing number-of-times of the non-volatile memory 30 (FIG. 1) to be wasted.

The storage device 10 (FIG. 1) according to the first embodiment can prevent such wasting of erasing number-of-times in the non-volatile memory 30 (FIG. 1).

[Effect of the First Embodiment]

As described above, the first embodiment has the following effect like (A).

(A) The storage device 10 evacuates partitioned data of which entry is stored in the logical-to-physical address translation table cache 22 prior to other partitioned data when partitioned data in the data cache 21 is evacuated. The entry is an entry of the logical-to-physical address translation table associated with the partitioned data to be evacuated. This can decrease number-of-times of evacuating (or writing) processing and read-out processing in the logical-to-physical address translation table cache 22, increases in speed of data read-out and data writing to/from an external device and prevents wasting of erasing number-of-times for the non-volatile memory 30 to prolong life thereof.

[Construction of a Second Embodiment]

Figure 17:
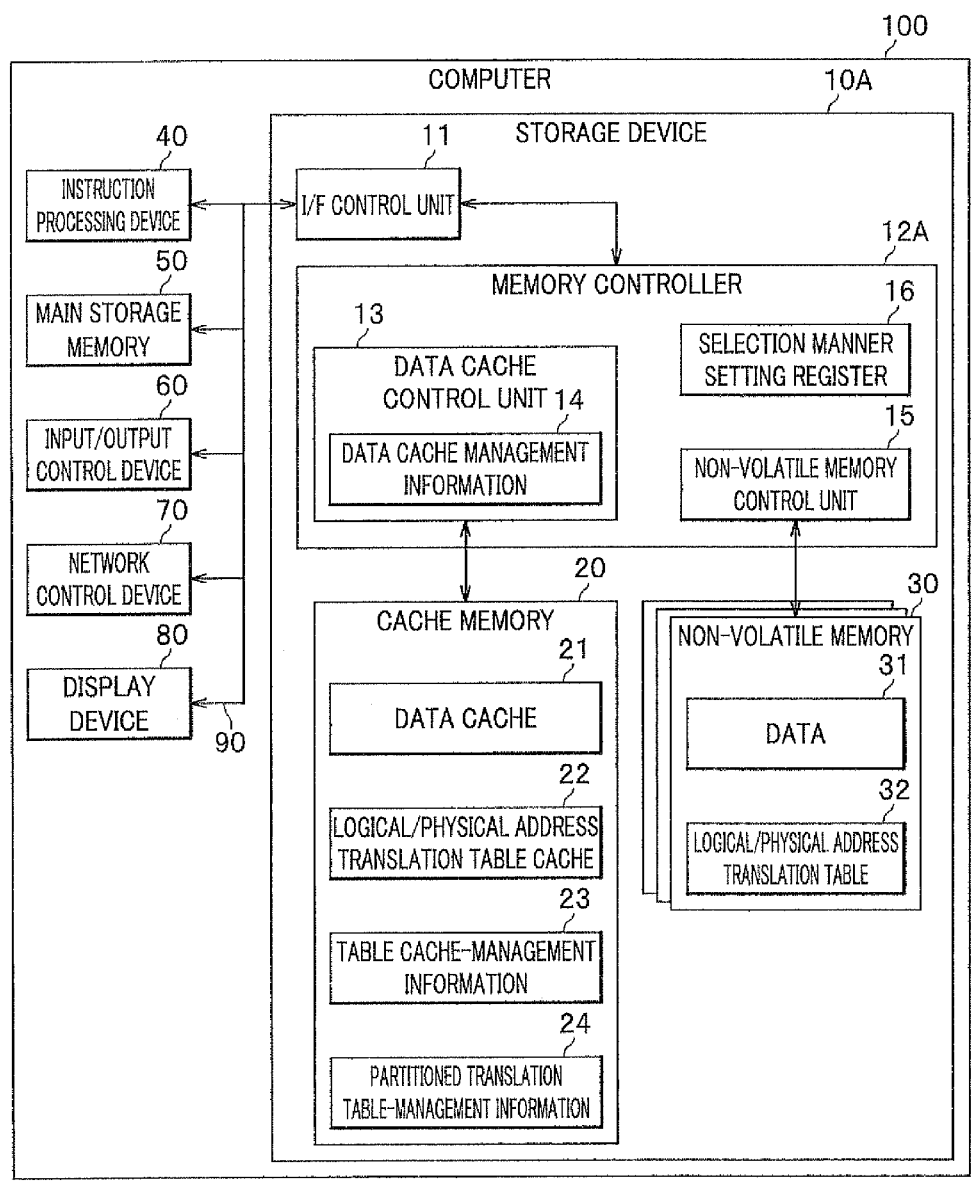
FIG. 17 is a construction diagram for schematically showing a computer according to a second embodiment of the present invention.

FIG. 17 is a construction diagram for schematically showing a computer according to a second embodiment of the present invention. The same elements as in the computer 100 (FIG. 1) in the first embodiment will be denoted by the same numbers or codes.

A storage device 10A according to the second embodiment has a same structure with the storage device 10 (FIG. 1) according to the first embodiment other than including a memory controller 12A which is different from the memory controller 12 (FIG. 1) in the storage device 10 according to the first embodiment.

The memory controller 12A according to the second embodiment further includes a selection manner setting register 16 in addition to the same construction as the memory controller 12 (FIG. 1) according to the first embodiment.

The selection manner setting register 16 can changes a selection algorithm thereof when an evacuating-target data to the non-volatile memory 30 is selected.

A value of the selection manner setting register 16 may be enabled to be set only at production and may be enabled to be arbitrarily changed from outside thereof. As a changing manner from outside, a changing instruction may be given from outside, for example, an instruction processing device 40, or may be changed by a switch mounted in the storage device 10.

The selection manner setting register 16 of the second embodiment is a register provided in a memory controller 12. However, it is not limited to this, and a selection manner setting register 16 may exist outside of the memory controller 12. Further, it may be a switch or a pin.

[Processing According to the Second Embodiment]

The data read-out processing according to the second embodiment is similar to the data read-out processing (FIG. 7) of the first embodiment.

The data evacuating processing to the non-volatile memory 30 (FIG. 17) according to the second embodiment is similar to the data evacuating processing (FIG. 8) to the non-volatile memory 30 (FIG. 1) according to the first embodiment.

Figure 18:
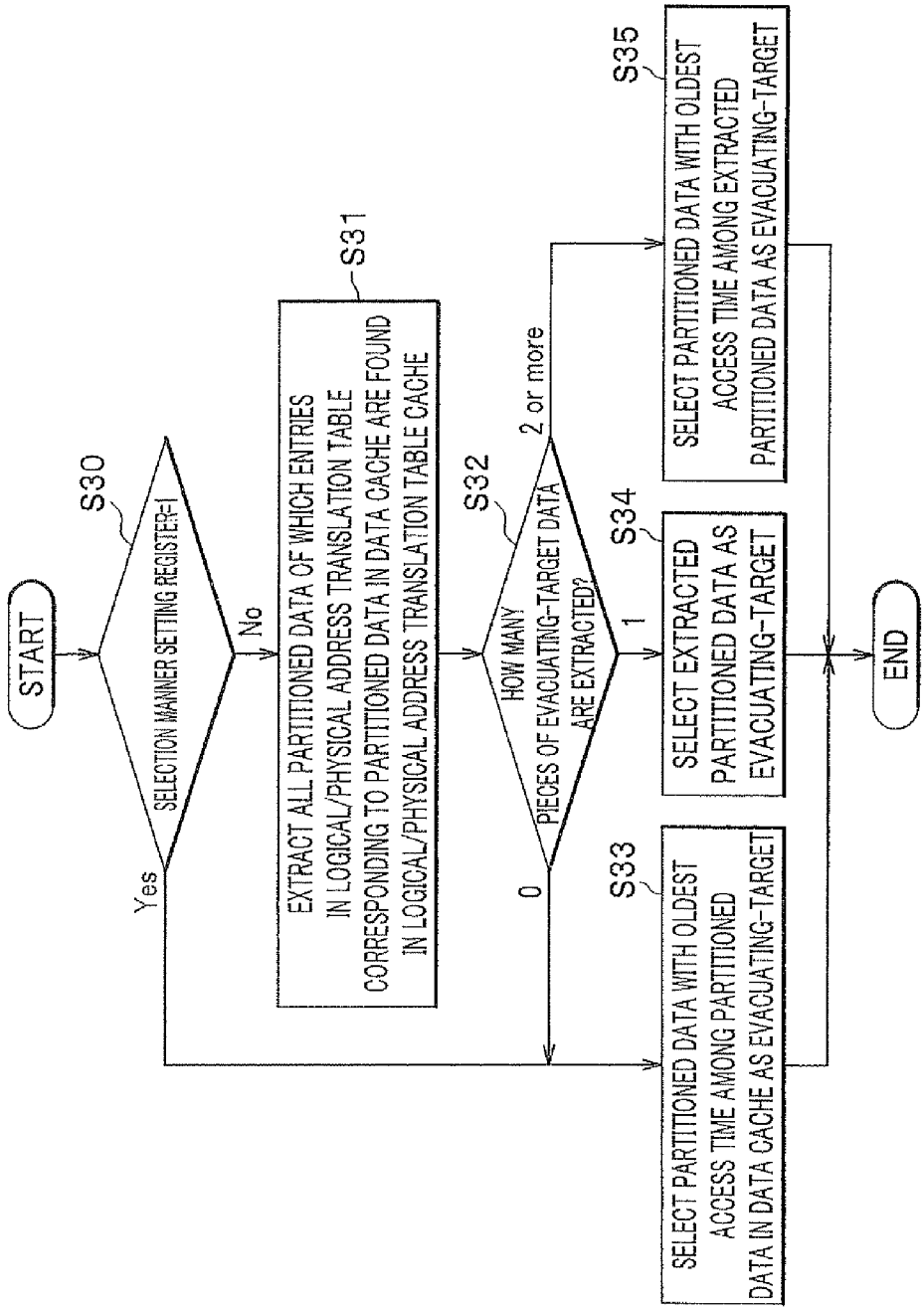
FIG. 18 is a flowchart showing selection processing of evacuating-target data according to the first embodiment of the present invention.

FIG. 18 is a flowchart showing selection processing for evacuating-target data according to the second embodiment of the present invention. The same elements as the evacuating-target data selection processing (FIG. 9) in the first embodiment will be denoted by the same numbers or codes.

When the selection processing for the evacuating-target data is started, a memory controller 12A (FIG. 17) in the storage device 10A determines whether or not the selection manner setting register 16 (FIG. 17) is "1". The memory controller 12A (FIG. 17) in the storage device 10A determines that this condition for decision is satisfied (Yes), the processing transfers to a step S33. Meanwhile, it determines that this condition for decision is not satisfied (No), the processing transfers to a step S31.

The processing at the step S31 to S35 is identical to the selection processing for evacuating-target data (FIG. 9) in the first embodiment.

According to the selection processing for the evacuating-target data according to the second embodiment, a memory controller 12A (FIG. 17) in the storage device 10A selects partitioned data in the data cache 21 (FIG. 17) based on a setting of the selection manner setting register 16 (FIG. 17), determines whether or not the algorithm of the first embodiment is used, and allows the partitioned data to be evacuated by using an existing LRU algorithm or the like.

Data read-out processing from the non-volatile memory 30 (FIG. 17) according to the second embodiment is similar to the data read-out processing (FIG. 10) from the non-volatile memory 30 (FIG. 1) according to the first embodiment.

Selection/evacuating processing for the partitioned translation table 32*p* (FIG. 4) according to the second embodiment is similar to the selection/evacuating processing (FIG. 11) for partitioned translation table 32*p* (FIG. 4) according to the first embodiment.

Entry updating processing of the logical-to-physical address translation table 32 (FIG. 4) according to the second embodiment is similar to the entry updating processing (FIG. 12) of the logical-to-physical address translation table 32 (FIG. 4) according to the first embodiment.

Data writing processing according to the second embodiment is similar to the data writing processing (FIG. 13) according to the first embodiment.

Processing at power-off according to the second embodiment is similar to the processing at power-off (FIG. 14) according to the first embodiment.

[Effect of the Second Embodiment]

As described above, the second embodiment has the following effect like (B).

(B) The memory controller 12A (FIG. 17) in the storage device 10A can select whether or not the algorithm used in the first embodiment is used based on a set value to the selection manner setting register 16 (FIG. 17).

[Construction of a Third Embodiment]

A storage device 10B (not shown) according to a third embodiment is similar to the storage device 10 (FIG. 1) according to the first embodiment other than including data cache management information 14B (FIG. 19) which is different from the data cache management information 14 (FIG. 1) in the storage device 10 according to the first embodiment and table cache-management information 23B (FIG. 20) which is different from the table cache-management information 23 (FIG. 1) in the storage device 10 according to the first embodiment.

FIG. 19 is a construction diagram for schematically showing data cache management information according to the third embodiment of the present invention.

Data cache management information 14B according to the third embodiment includes a data updating flag 14d in addition to a similar construction to the data cache management information 14 (FIG. 3) according to the first embodiment.

The data updating flag 14d is information indicating whether or not contents stored in the non-volatile memory 30 are different from the contents of corresponding partitioned data in the data cache 21 (FIG. 1) after updating thereof. "1" is held in the data updating flag 14d in case that the corresponding partitioned data is updated, while "0" is held therein in case that the corresponding partitioned data is not updated.

FIG. 20 is a construction diagram for schematically showing table cache-management information according to the third embodiment of the present invention.

The table cache-management information 23B according to the third embodiment further includes table updating flag 23d in addition to the similar construction to the table cache-management information 23 (FIG. 5) according to the first embodiment.

The table updating flag 23d is information showing if the partitioned translation table 32p (FIG. 4) corresponding to the table updating flag 23d is updated and whether or not the contents of the partitioned translation table 32p (FIG. 4) corresponding to the table updating flag 23d is different from the contents stored in the non-volatile memory 30. The table updating flag 23d holds "1" in case that the corresponding partitioned translation table 32p (FIG. 4) is updated. While, it holds "0" in case that the corresponding partitioned translation table 32p (FIG. 4) is not updated.

[Processing according to the Third Embodiment]

Data read-out processing according to the third embodiment is similar to the data read-out processing (FIG. 7) according to the first embodiment.

Figure 21:
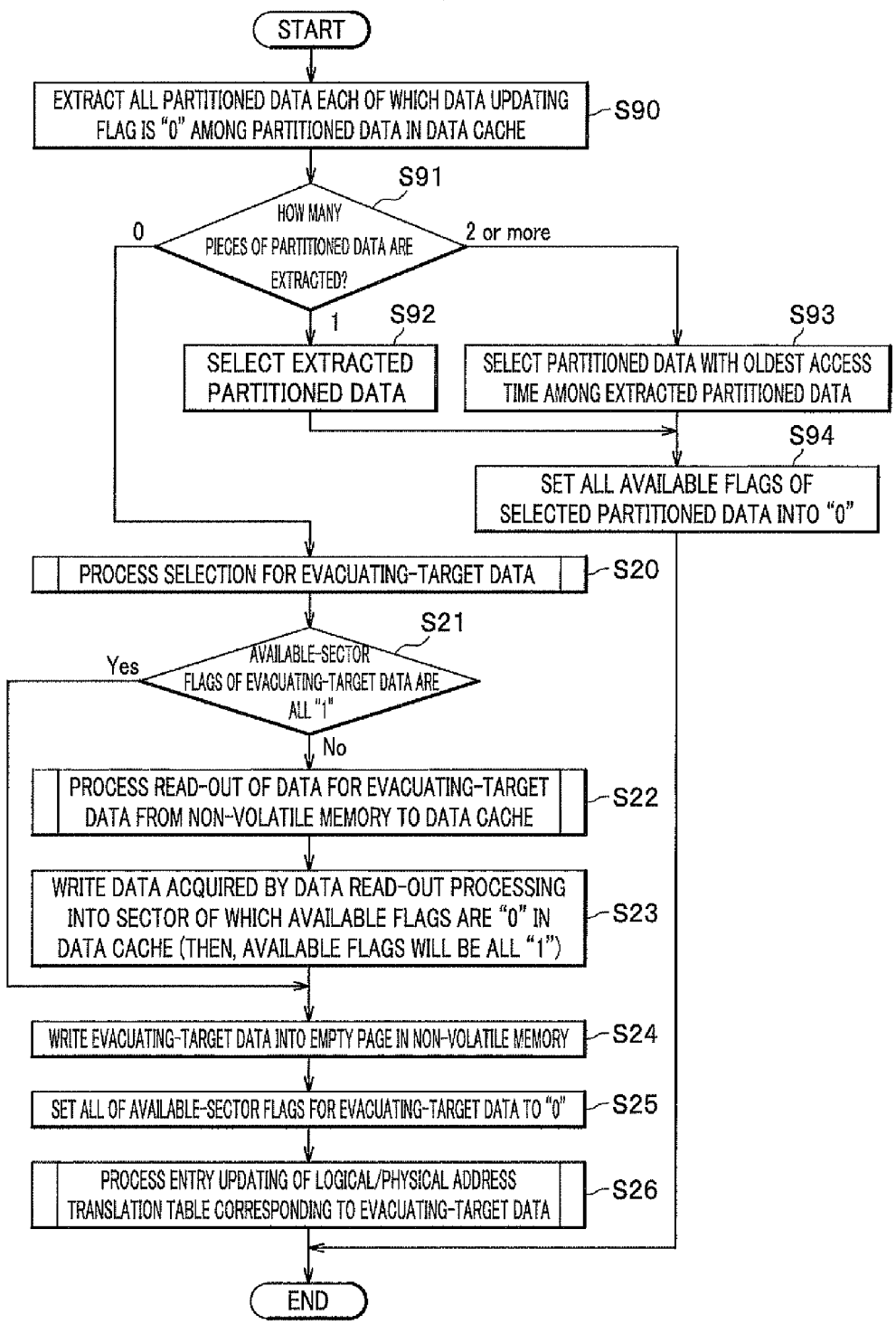
FIG. 21 is a flowchart showing data evacuating processing to the non-volatile memory according to the first embodiment of the present invention.

FIG. 21 is a flowchart showing data evacuating processing to the non-volatile memory according to the first embodiment of the present invention. The same elements as the data evacuating processing to the non-volatile memory 30 (FIG. 8) in the first embodiment will be denoted by the same numbers or codes.

When data evacuating processing to the non-volatile memory 30 is started, at the step S90, a memory controller 12 in the storage device 10B extracts all of the partitioned data of which data updating flag 14d (FIG. 19) is "0" among the partitioned data in the data cache 21 as an evacuating-target.

At the step S91, the memory controller 12 (FIG. 1) in the storage device 10 determines how many pieces of the evacuating-target partitioned data are extracted. The memory controller 12 (FIG. 1) in the storage device 10B performs the processing at the step S20 when a number of extracted pieces is zero. The memory controller 12 (FIG. 1) in the storage device 10B performs the processing at the step S92 when a number of extracted pieces is one. The memory controller 12 (FIG. 1) in the storage device 10B performs the processing at the step S93 when a number of extracted pieces is two or more.

The processing at the steps S20 to S26 is similar to the processing at the steps S20 to S26 shown in FIG. 8. After the processing at step S26 is finished, the memory controller 12 (FIG. 1) in the storage device 10B finishes the processing illustrated in FIG. 21.

At the step S92, the memory controller 12 (FIG. 1) in the storage device 10 selects the extracted partitioned data as an evacuating-target and performs the processing at the step S94.

At the step S93, the memory controller 12 (FIG. 1) in the storage device 10 selects extracted partitioned data with the oldest accessed time among the extracted partitioned data.

At the step S94, a memory controller 12 in the storage device 10B sets all of the available-sector flags 14c (FIG. 19) for the selected partitioned data to "0" and then the processing illustrated in FIG. 21 is finished.

Figure 22:
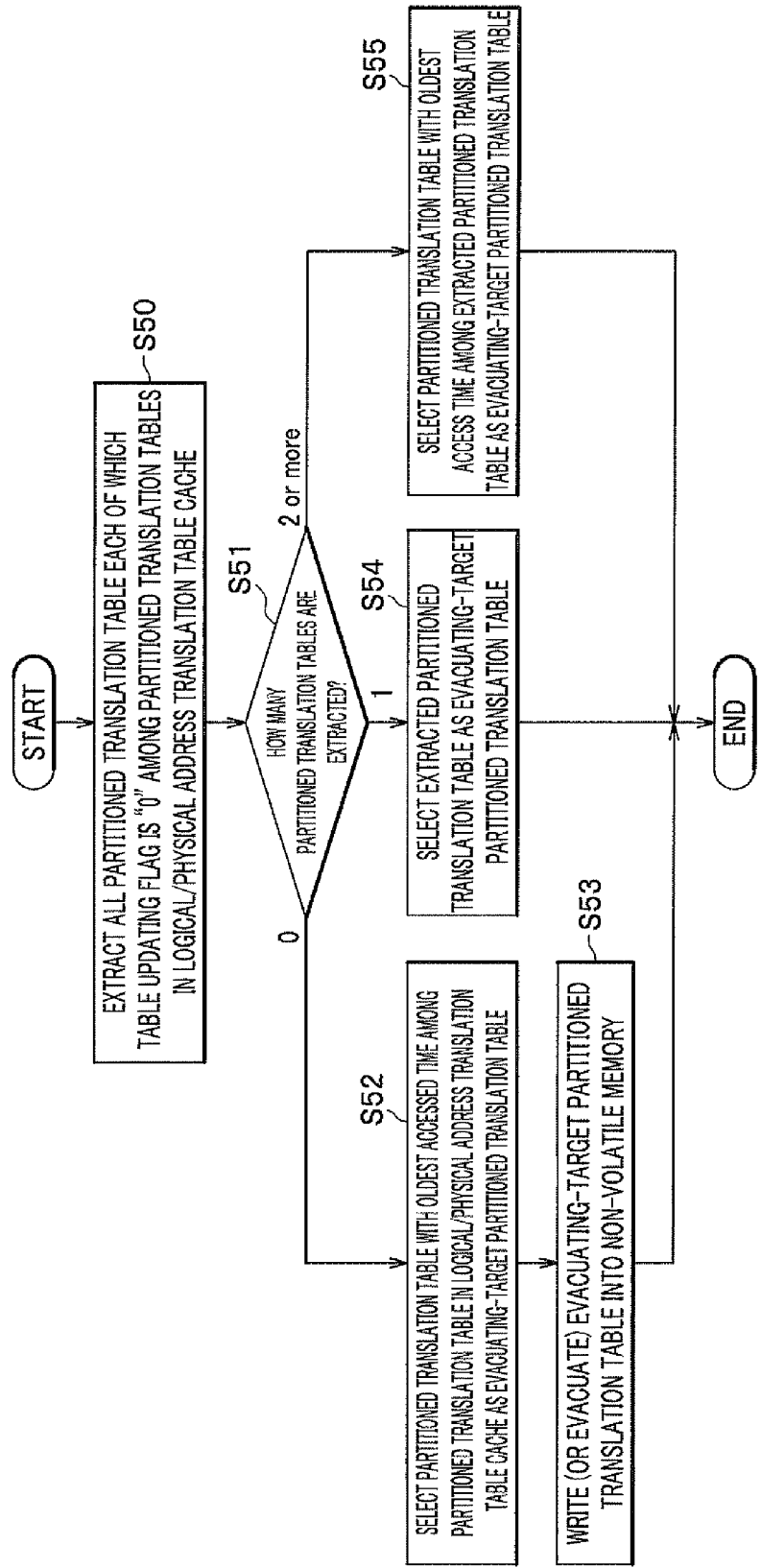
FIG. 22 is a flowchart showing selection/evacuating processing in the partitioned translation table according to the first embodiment of the present invention.

FIG. 22 is a flowchart showing selection/evacuating processing of the partitioned translation table according to the third embodiment of the present invention. The same elements as the selection/evacuating processing in the partitioned translation table 32p (FIG. 9) in the first embodiment will be denoted by the same numbers or codes.

When the selection/evacuating processing of the partitioned translation table 32p is started, at the step S50, the data cache control unit 13 in the storage device 10 extracts all partitioned translation tables 32p of which corresponding table updating flags 23d (FIG. 20) are "0" among the partitioned translation tables 32p in the logical-to-physical address translation table cache 22.

At the step S51, the cache control unit 13 in the storage device 10 determines how many partitioned translation tables 32p are extracted. The cache control unit 13 in the storage device 10 performs the processing at the step S52 when a number of extracted partitioned translation tables is zero. The cache control unit 13 in the storage device 10 performs the processing at the step S54 when a number of extracted partitioned translation tables is one. The cache control unit 13 in the storage device 10 performs the processing at the step S55 when a number of extracted partitioned translation tables is two or more.

The processing at the steps S52 to S53 is similar to the processing at the step S52 to S53 illustrated in FIG. 11. When the processing at the step S53 is finished, the data cache control unit 13 in the storage device 10 finishes the processing illustrated in FIG. 22.

At the step S54, the data cache control unit 13 in the storage device 10 selects the extracted partitioned translation table 32p as an evacuating-target of the partitioned translation table 32p and then finishes the processing illustrated in FIG. 22.

At the step S55, the data cache control unit 13 in the storage device 10 selects a partitioned translation table 32p with the oldest accessed time among them as an evacuating-target of partitioned translation table 32p and then finishes the processing illustrated in FIG. 22. The memory controller 12 (FIG. 1) in the storage device 10 determines the accessed time to the partitioned translation table 32p by using the access time field (not shown) of the table cache-management information 23.

Data read-out processing from the non-volatile memory 30 according to the third embodiment is similar to the data read-out processing (FIG. 10) from the non-volatile memory 30 (FIG. 1) according to the first embodiment.

Selection/evacuating processing of the partitioned translation table 32p according to the third embodiment is similar to the selection/evacuating processing (FIG. 11) in the partitioned translation table 32p (FIG. 4) according to the first embodiment.

Entry updating processing of the logical-to-physical address translation table 32 (FIG. 4) according to the third embodiment is similar to the entry updating processing (FIG. 12) of the logical-to-physical address translation table 32 (FIG. 4) according to the first embodiment.

Data writing processing according to the third embodiment is similar to the data writing processing (FIG. 13) according to the first embodiment.

Figure 23:
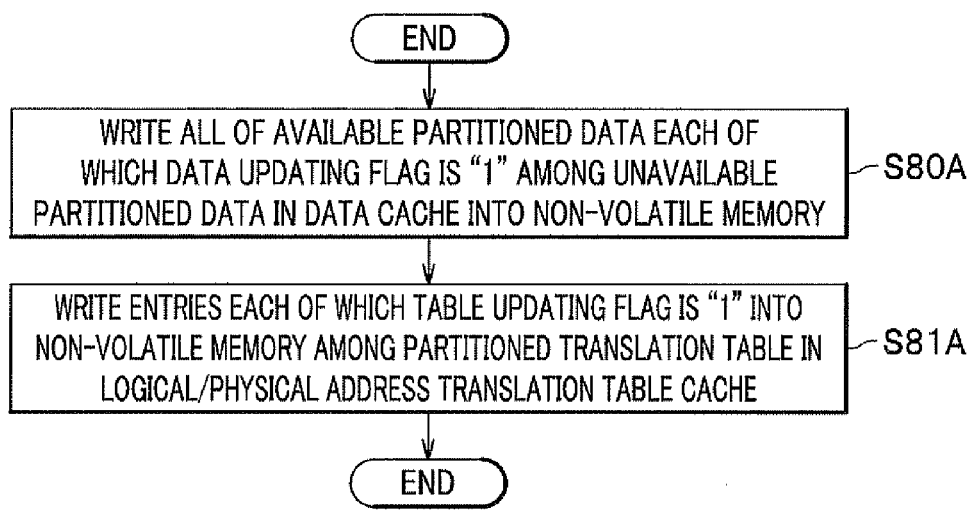
FIG. 23 is a flowchart showing the processing at power-off according to the third embodiment of the present invention.

FIG. 23 is a flowchart showing the processing at power-off according to the third embodiment of the present invention.

The same elements as the processing at power-off (FIG. 14) in the first embodiment will be denoted by the same numbers or codes.

When the processing at power-off is started, at the step S80A, a memory controller 12 in the storage device 10B writes (or evacuates) all available partitioned data of which corresponding data updating flag 14d (FIG. 19) is "1" into the non-volatile memory 30 among the unavailable partitioned data in the data cache 21.

That is, the memory controller 12 in the storage device 10B writes (or evacuates) partitioned data of which corresponding data updating flag 14d (FIG. 20) is "1" among partition data corresponding to entries of which available-sector flag 14c (FIG. 20) of the data cache entry management information 14 is not all "0" into the non-volatile memory 30.

At the step S81A, the memory controller 12 in the storage device 10B writes (or evacuates) only a partitioned translation table 32p having a table updating flag 23d (FIG. 20) of the table cache-management information 23 to be "1" among the partitioned translation tables 32p stored in the logical-to-physical address translation table cache 22. When the processing at the step S81A is finished, a memory controller 12 in the storage device 10B finishes the processing illustrated in FIG. 23.

[Effect of the Third Embodiment]

As described above, the third embodiment has the following effect like (C) to (F).

(C) When the memory controller 12 in the storage device 10B creates an empty entry in the data cache 21, according to the data updating flag 14d, it selects partitioned data which is not updated prior to other partitioned data. Then, it discards the partitioned data associated with the selected entry to set the partitioned data as an empty entry. This enables an empty entry to be created in the data cache 21 at high speed without performing data evacuating processing (or writing processing) into the non-volatile memory 30 and also enables writing number-of-times for the non-volatile memory 30 to be decreased resulting in a prolonged life thereof.

(D) When the memory controller 12 in the storage device 10B creates an empty entry in the logical-to-physical address translation table cache 22, according to the table updating flag 23d, it selects partitioned translation table 32p which is not updated prior to other partitioned translation table 32p. It abandons the partitioned translation table 32p associated with the selected entry and sets it as an empty entry. This enables an empty entry to be created in the logical-to-physical address translation table cache 22 at high speed without performing data evacuating processing (or writing processing) into the non-volatile memory 30 and also enables writing number-of-times for the non-volatile memory 30 to be decreased resulting in a prolonged life thereof.

(E) The memory controller 12 in the storage device 10B only evacuates updated partitioned data according to the data updating flag 14d at power-off. This enables the data cache 21 to be evacuated at high speed and also enables writing number-of-times for the non-volatile memory 30 to be decreased resulting in a prolonged life thereof.

(F) The memory controller 12 in the storage device 10B only evacuates updated partitioned translation table 32p according to the table updating flag 23d at power-off. This enables the logical-to-physical address translation table cache 22 to be evacuated at high speed and also enables writing number-of-times for the non-volatile memory 30 to be decreased resulting in a prolonged life thereof.

[Variety of Modified Embodiments]

The present invention is not limited to the above-described embodiments, but includes a variety of modified embodiments in the scope without departing from the gist of the present invention. For example, these aspects or variety of modified embodiments include, for example, the followings examples as shown in (a) to (d).

(a) The cache memory 20 according to the first to third embodiments can be constructed as a non-volatile RAM which is backed up by battery. This enables the processing at power-off to be omitted.

(b) A partial element or the entire element of each configuration, each function, each processing unit, and each processing method described in the first to third embodiments may be implemented using hardware, for example, an integrated circuit.

(c) Each configuration, each function, each processing unit and each means for processing described in the first to third embodiments may be implemented with software in such a manner that a processor interprets and executes a program for implementing each function.

(d) The data cache management information 14, the table cache-management information 23, the partitioned translation table-management information 24 and the like according to the first to third embodiments may be implemented by using other management information including other items.

The invention claimed is:

1. A storage device comprising:
a non-volatile memory for performing data read-out/writing processing therefrom/therein and including a logical-to-physical address translation table having a plurality of entries, the data read-out/writing processing being performed by a predetermined unit of writing data referred to as a page, and by a unit of erasing data referred to as a block which has a larger size than the unit of writing data, the plurality of entries being used for managing partitioned data which is partitioned by unit of the page size and a storage location of each partitioned data, wherein the partitioned data includes first partitioned data and second partitioned data;
a cache memory for performing data read-out/writing processing therefrom/therein and including a logical-to-physical address translation table cache and a data cache, the logical-to-physical address translation table cache temporarily storing a portion of the logical-to-physical address translation table, the data cache temporarily storing the partitioned data; and
a memory controller for performing the data read-out/writing processing from/into the non-volatile memory and the cache memory:
wherein
the memory controller receives a read-out request for data from outside and includes a processing unit, in the case that no entry corresponding to the read-out requested data exists in the data cache and no empty entry exists in the data cache, the processing unit evicting first partitioned data, wherein the entries in the logical-to-physical address translation table corresponding to the first partitioned data are found in the logical-to-physical address translation table cache, into the non-volatile memory prior to second partitioned data in the data cache to create an empty entry in the data cache, and reading out the read-out requested data into the empty entry.

2. The storage device according to claim 1, wherein
when the memory controller receives a writing request for data from outside, in the case that no entry corresponding to the writing requested data exists in the data cache and no empty entry exists in the data cache, the memory controller evicts first partitioned data into the non-volatile memory prior to second partitioned data in the data cache to create an empty entry in the data cache, and writes the writing requested data into the empty entry.

3. The storage device according to claim 1, wherein the logical-to-physical address translation table cache is partitioned to a plurality of partitioned translation table, the partitioned translation table being a predetermined unit of writing data in the non-volatile memory, the cache memory includes partitioned translation table-management information to manage whether or not the partitioned translation table exists in the logical-to-physical address translation table cache, and the memory controller determines whether or not an entry of the logical-to-physical address translation table corresponding to the partitioned data in the data cache exists in the logical-to-physical address translation table cache according to the partitioned translation table-management information.

4. The storage device according to claim 1, wherein the memory controller includes a selection manner setting register, and when evacuating-target data is selected from the data cache, the memory controller changes a selection manner based on a value of the selection manner setting register, the value indicating whether or not first partitioned data is evicted into the non-volatile memory prior to second partitioned data in the data cache.

5. The storage device according to claim 3, wherein the cache memory further includes table cache-management information, the table cache-management information includes a first updating flag for indicating whether or not the partitioned translation table is identical to the information stored in the logical-to-physical address translation table, and in the case that the partitioned translation table which is identical to the information stored in the logical-to-physical address translation table is found according to the first updating flag, the memory controller abandons the partitioned translation table to create an empty entry in the logical-to-physical address translation table.

6. The storage device according to claim 1, wherein the cache memory further includes data cache management information, the data cache management information has a second updating flag for indicating whether or not the partitioned data in the data cache is identical to the partitioned data stored in the non-volatile memory, and in the case that partitioned data which is identical to the partitioned data stored in the non-volatile memory is found in the data cache according to the second updating flag, the memory controller abandons the partitioned data to create an empty entry in the data cache.

7. The storage device according to claim 1, wherein the cache memory is a non-volatile Random Access Memory.

8. A computer comprising:

a non-volatile memory for performing data read-out/writing processing therefrom/therein and including a logical-to-physical address translation table having a plurality of entries, the data read-out/writing processing being performed by a predetermined unit of writing data referred to as a page, and by a unit of erasing data referred to as a block which has a larger size than the unit of writing data, the plurality of entries being used for managing partitioned data which is partitioned by unit of the page size and the storage location for each partitioned data, wherein the partitioned data includes first partitioned data and second partitioned data;

a cache memory for performing data read-out/writing processing therefrom/therein and including a logical-to-physical address translation table cache and a data cache, the logical-to-physical address translation table cache temporarily storing a portion of the logical-to-physical address translation table, the data cache temporarily storing the partitioned data; and a memory controller for performing the data read-out/writing processing from/into the non-volatile memory and the cache memory, wherein the memory controller receives a read-out request for data from outside and includes a processing unit, in the case that no entry corresponding to the read-out requested data exists in the data cache and no empty entry exists in the data cache, the processing unit evicting first partitioned data, wherein the entries in the logical-to-physical address translation table corresponding to the first partitioned data are found in the logical-to-physical address translation table cache, into the non-volatile memory prior to second partitioned data in the data cache to create an empty entry in the data cache, and reading out the read-out requested data into the empty entry.

* * * * *